(12) United States Patent
Shichino

(10) Patent No.: US 12,470,091 B2
(45) Date of Patent: Nov. 11, 2025

(54) POWER TRANSMISSION APPARATUS, POWER RECEIVING APPARATUS, CONTROL METHODS THEREOF, AND STORAGE MEDIUM

(71) Applicant: CANON KABUSHIKI KAISHA, Tokyo (JP)

(72) Inventor: Takahiro Shichino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 101 days.

(21) Appl. No.: 17/887,070

(22) Filed: Aug. 12, 2022

(65) Prior Publication Data

US 2023/0124614 A1 Apr. 20, 2023

Related U.S. Application Data

(63) Continuation of application No. PCT/JP2021/002216, filed on Jan. 22, 2021.

(30) Foreign Application Priority Data

Feb. 14, 2020 (JP) .................. 2020-023666

(51) Int. Cl.
*H02J 50/60* (2016.01)
*G01V 3/10* (2006.01)
*H02J 50/12* (2016.01)
*H02J 50/80* (2016.01)

(52) U.S. Cl.
CPC .............. *H02J 50/60* (2016.02); *G01V 3/101* (2013.01); *H02J 50/12* (2016.02); *H02J 50/80* (2016.02)

(58) Field of Classification Search
CPC ............ H02J 50/60; H02J 50/80; H02J 50/12
See application file for complete search history.

(56) References Cited

U.S. PATENT DOCUMENTS

| | | | |
|---|---|---|---|
| 2017/0010307 A1 | 1/2017 | Komiyama | |
| 2017/0117755 A1* | 4/2017 | Muratov | ................. H02J 50/12 |
| 2017/0271908 A1 | 9/2017 | Li | |
| 2019/0245387 A1 | 8/2019 | Park | |
| 2019/0319494 A1* | 10/2019 | Park | ......................... H02J 3/02 |
| 2020/0127501 A1* | 4/2020 | Song | .................... H02J 50/402 |
| 2020/0343765 A1* | 10/2020 | Kwon | ..................... H02J 50/80 |
| 2021/0184513 A1* | 6/2021 | Park | ......................... H02J 50/60 |
| 2021/0384769 A1* | 12/2021 | Staring | ................... H02J 50/60 |

FOREIGN PATENT DOCUMENTS

| | | |
|---|---|---|
| EP | 3480588 A | 5/2019 |
| JP | 2013-135518 A | 7/2013 |
| JP | 2017-022999 A | 1/2017 |
| JP | 2017-070074 A | 4/2017 |
| KR | 20190050301 A | 5/2019 |
| WO | 2019/088760 A1 | 5/2019 |

* cited by examiner

Primary Examiner — Rexford N Barnie
Assistant Examiner — Rasem Mourad
(74) Attorney, Agent, or Firm — Canon U.S.A., Inc. IP Division

(57) ABSTRACT

A power transmission apparatus 100 wirelessly transmits power to a power receiving device 102 via a power transmission coil 304, measures a Q factor of the power transmission coil 304 in the time domain, and determines presence or absence of an object (foreign object) different from the power receiving apparatus 102 based on the Q factor measured in the time domain and a reference value of the Q factor which is based on information obtained from the power receiving apparatus 102.

6 Claims, 12 Drawing Sheets

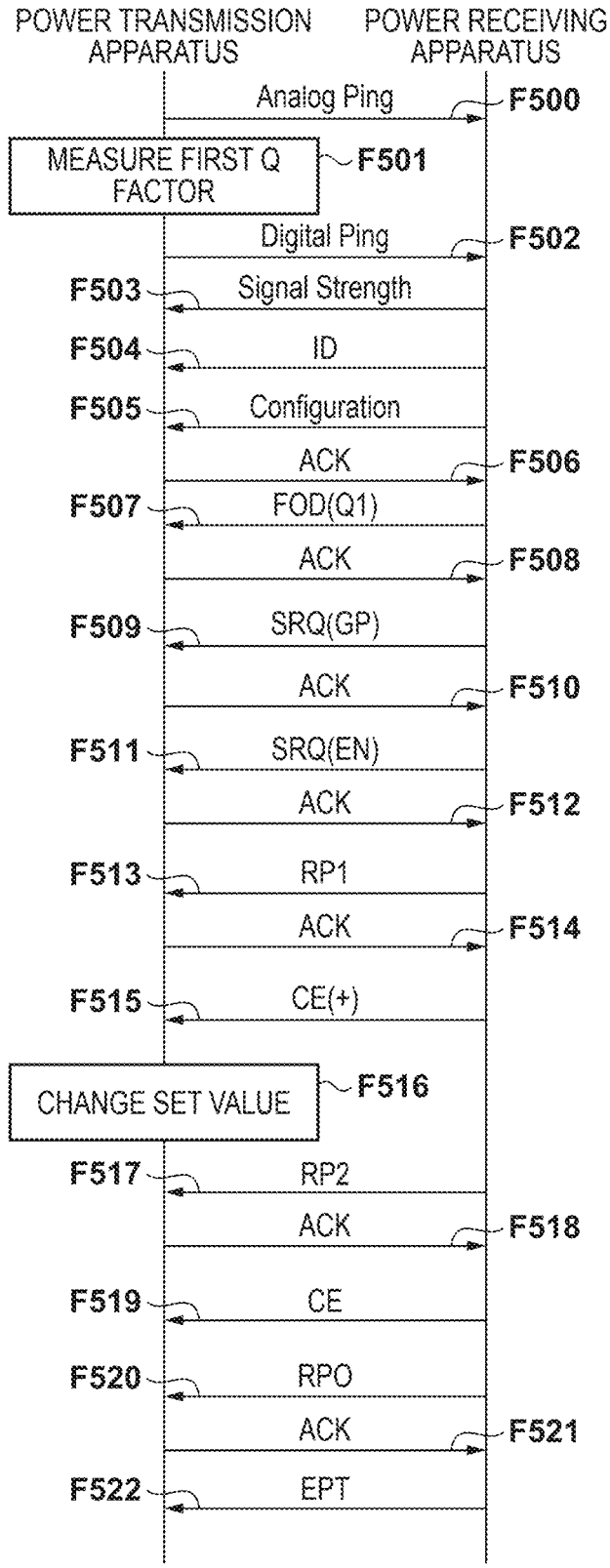

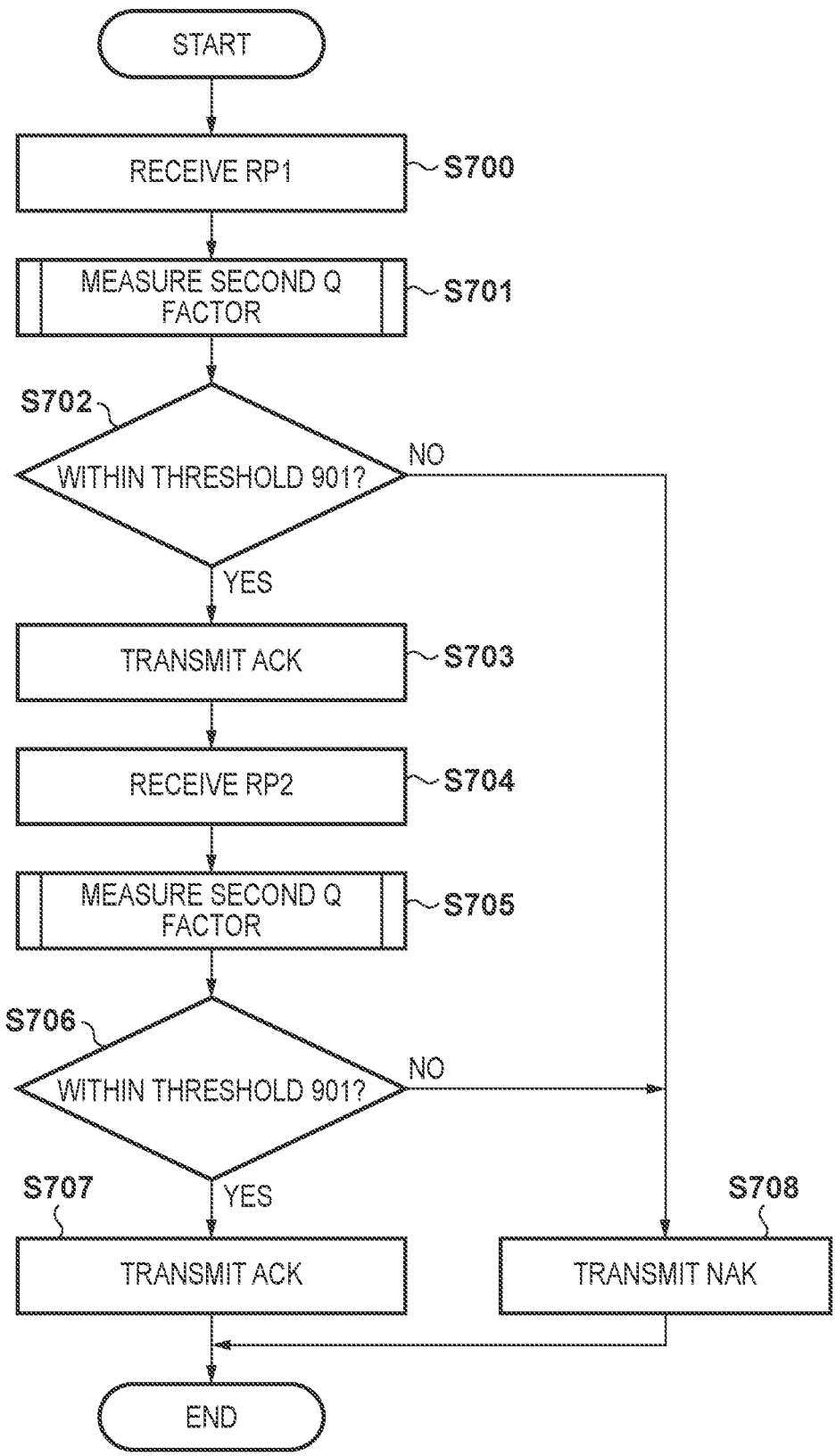

FIG. 8
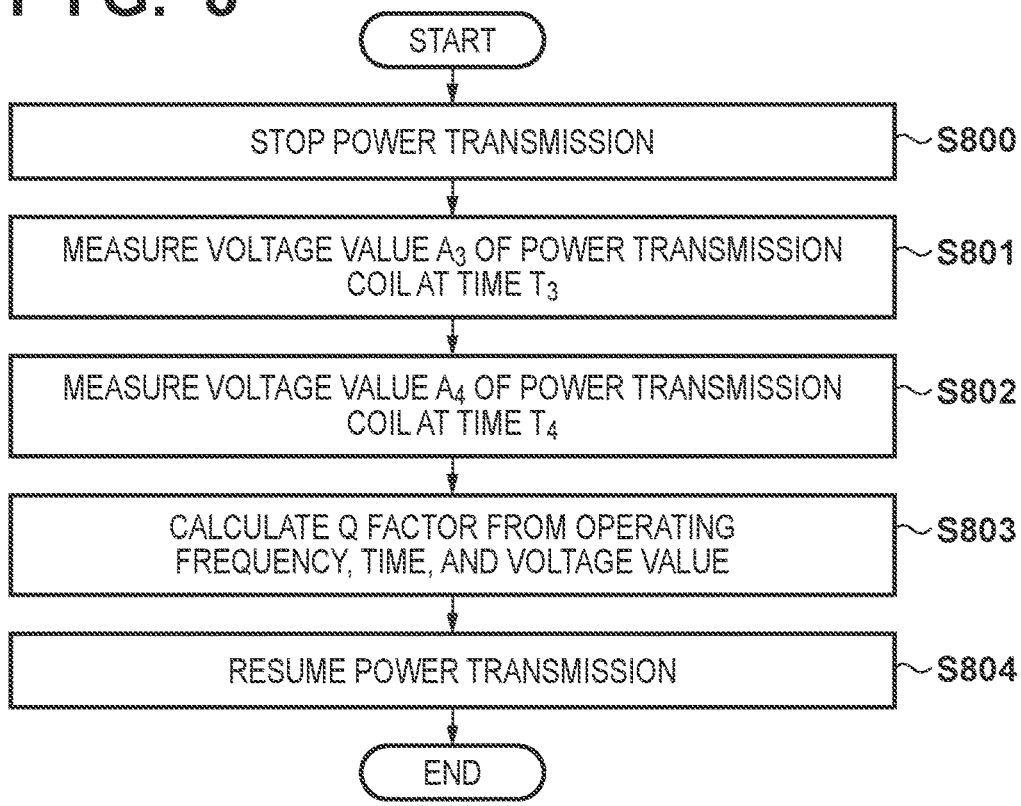
FIG. 9
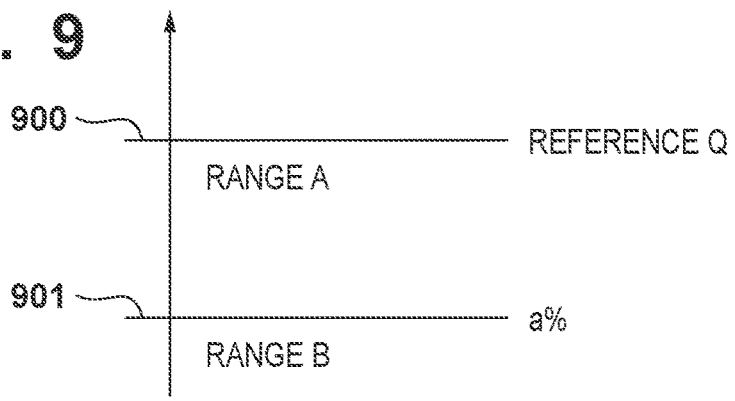
FIG. 10
| | Bit7 | Bit6 | Bit5 | Bit4 | Bit3 | Bit2 | Bit1 | Bit0 |
|---|---|---|---|---|---|---|---|---|
| Bank1 | reserved | | | | | | mode | |
| Bank2 | reference Q factor value | | | | | | | |
1000

US 12,470,091 B2

POWER TRANSMISSION APPARATUS, POWER RECEIVING APPARATUS, CONTROL METHODS THEREOF, AND STORAGE MEDIUM

CROSS-REFERENCE TO RELATED APPLICATIONS

This application is a Continuation of International Patent Application No. PCT/JP2021/002216, filed Jan. 22, 2021, which claims the benefit of Japanese Patent Application No. 2020-023666, filed Feb. 14, 2020, both of which are hereby incorporated by reference herein in their entirety.

BACKGROUND

Technical Field

The present disclosure relates to a wireless power transmission technique.

Background Art

Technology development of wireless power transmission systems has widely been conducted. PTL 1 discloses a power transmission apparatus and a power receiving apparatus, which comply with a standard (WPC standard) formulated by the Wireless Power Consortium (WPC) that is a standardization organization for wireless charging standards. PTL 1 also discloses a foreign object detection method for, in a case where a foreign object exists near a power transmission/receiving apparatus, detecting the foreign object and restricting power transmission/reception.

PTL 2 discloses a method of measuring the Q factor (Quality factor) of the coil in a wireless power transmission system. PTL 2 also discloses a technique of applying a high-frequency signal to a power transmission coil of a wireless power transmission system for a certain period, measuring a Q factor from the time-rate change of a voltage in the power transmission coil, and detecting a foreign object based on the change of the Q factor.

Concerning the technique of detecting a foreign object by measuring the Q factor from the time-rate change of the voltage in the power transmission coil, as disclosed in PTL 2, a method of more appropriately performing this has not been proposed so far.

CITATION LIST

Patent Literature

PTL 1: Japanese Patent Laid-Open No. 2017-70074 PTL 2: Japanese Patent Laid-Open No. 2017-022999

SUMMARY

In consideration of the above-described problem, the present disclosure provides a more appropriate control method for foreign object detection using a Q factor based on the transmission power waveform of a power transmission coil in a state in which power transmission is stopped.

According to one aspect of the present disclosure, there is provided a power transmission apparatus comprising: a power transmitting configured to wirelessly transmit power to a power receiving apparatus via a power transmission coil; a measuring configured to measure a Q factor based on a transmission power waveform in a state in which power transmission is stopped; an obtaining configured to obtain, information from the power receiving apparatus; and a determining configured to determine, based on the Q factor based on the transmission power waveform, which is measured by the measuring unit, and a reference value of the Q factor based on the information obtained by the obtaining unit, presence/absence of an object different from the power receiving apparatus.

According to another aspect of the present disclosure, there is provided a power receiving apparatus comprising: a power receiving configured to wirelessly receive power from a power transmission apparatus configured to determine, based on a Q factor of a power transmission coil based on a transmission power waveform of the power transmission coil in a state in which power transmission is stopped, presence/absence of an object different from the power receiving apparatus; and a transmitting configured to transmit, to the power transmission apparatus, information concerning a reference value of the Q factor used in the determination.

According to another aspect of the present disclosure, there is provided a control method of a power transmission apparatus configured to wirelessly transmit power to a power receiving apparatus via a power transmission coil, the method comprising: measuring a Q factor based on a transmission power waveform in a state in which power transmission is stopped; obtaining information from the power receiving apparatus; and determining, based on the Q factor based on the transmission power waveform, which is measured in the measuring, and a reference value of the Q factor based on the information obtained in the obtaining, presence/absence of an object different from the power receiving apparatus.

According to another aspect of the present disclosure, there is provided a control method of a power receiving apparatus, the method comprising: wirelessly receiving power from a power transmission apparatus configured to determine, based on a Q factor of a power transmission coil based on a transmission power waveform of the power transmission coil in a state in which power transmission is stopped, presence/absence of an object different from the power receiving apparatus; and transmitting, to the power transmission apparatus, information concerning a reference value of the Q factor used in the determination.

According to another aspect of the present disclosure, there is provided a non-transitory computer-readable storage medium storing a program for causing a computer to execute a control method of a power transmission apparatus configured to wirelessly transmit power to a power receiving apparatus via a power transmission coil, the method comprising: measuring a Q factor based on a transmission power waveform in a state in which power transmission is stopped; obtaining information from the power receiving apparatus; and determining, based on the Q factor based on the transmission power waveform, which is measured in the measuring, and a reference value of the Q factor based on the information obtained in the obtaining, presence/absence of an object different from the power receiving apparatus.

According to another aspect of the present disclosure, there is provided a non-transitory computer-readable storage medium storing a program for causing a computer to execute a control method of a power receiving apparatus, the method comprising: wirelessly receiving power from a power transmission apparatus configured to determine, based on a Q factor of a power transmission coil based on a transmission power waveform of the power transmission coil in a state in which power transmission is stopped, presence/absence of an object different from the power receiving apparatus; and transmitting, to the power transmission apparatus, information concerning a reference value of the Q factor used in the determination.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the disclosure and, together with the description, serve to explain principles of the disclosure.

FIG. 5A is a sequence chart for explaining the operations of a power transmission apparatus and a power receiving apparatus in a conventional technique;

FIG. 6B-1 is a flowchart showing another creation processing of another reference Q factor in a case where the third foreign object detection method is applied to the WPC standard;

FIG. 6B-2 is a flowchart showing another creation processing of another reference Q factor in a case where the third foreign object detection method is applied to the WPC standard;

FIG. 7 is a flowchart of Calibration processing;

FIG. 8 is a flowchart showing Q factor (second Q factor) measurement processing in a time domain;

FIG. 9 is a conceptual view of thresholds in third foreign object detection processing;

FIG. 10 shows the frame format of an FOD Status packet;

DESCRIPTION OF THE EMBODIMENTS

Figure 1:
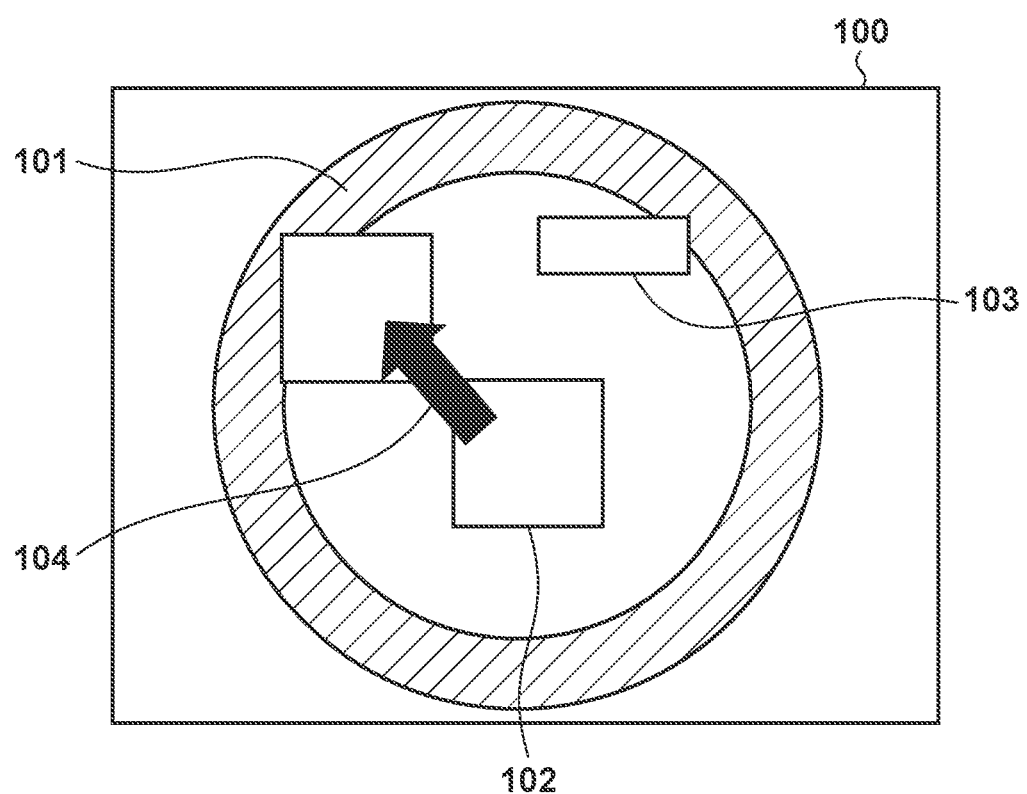
FIG. 1 is a view showing an example of the configuration of a wireless power transmission system.

Hereinafter, embodiments will be described in detail with reference to the attached drawings. Note, the following embodiments are not intended to limit the scope of the present disclosure. Multiple features are described in the embodiments, but limitation is not made to the present disclosure that requires all such features, and multiple such features may be combined as appropriate. Furthermore, in the attached drawings, the same reference numerals are given to the same or similar configurations, and redundant description thereof is omitted.

First Embodiment (Configuration of System)

FIG. 1 is a view showing an example of the configuration of a wireless power transmission system according to this embodiment. In an example, this system is configured to include a power receiving apparatus 102 and a power transmission apparatus 100. The power receiving apparatus 102 and the power transmission apparatus 100 comply with the WPC (Wireless Power Consortium) standard. The power receiving apparatus 102 is an electronic device that receives power from the power transmission apparatus 100 and charges an internal battery. The power receiving apparatus 102 may be configured to be incorporated in another apparatus (a camera, a smartphone, a tablet PC, a laptop, an automobile, a robot, a medical device, or a printer). The power transmission apparatus 100 may be a camera, a smartphone, a tablet PC, a laptop, an automobile, a robot, a medical device, or a printer.

The power transmission apparatus 100 is an electronic device that wirelessly transmits power to, for example, the power receiving apparatus 102 placed on itself. The power transmission apparatus 100 wirelessly transmits power to the power receiving apparatus 102 via a power transmission coil (power transmission antenna) 101 (corresponding to a power transmission coil 304 shown in FIG. 3 to be described later). FIG. 1 shows a state in which a conductive foreign object 103 exists in a range (operating volume) affected by wireless power transmitted from the power transmission coil 101. An arrow 104 shows that the power receiving apparatus 102 moves on the power transmission apparatus 100, and the positional relationship between the power transmission coil 101 and the power receiving coil (power receiving antenna) of the power receiving apparatus 102 changes before and after the movement.

(Configurations of Apparatuses)

Figure 2:
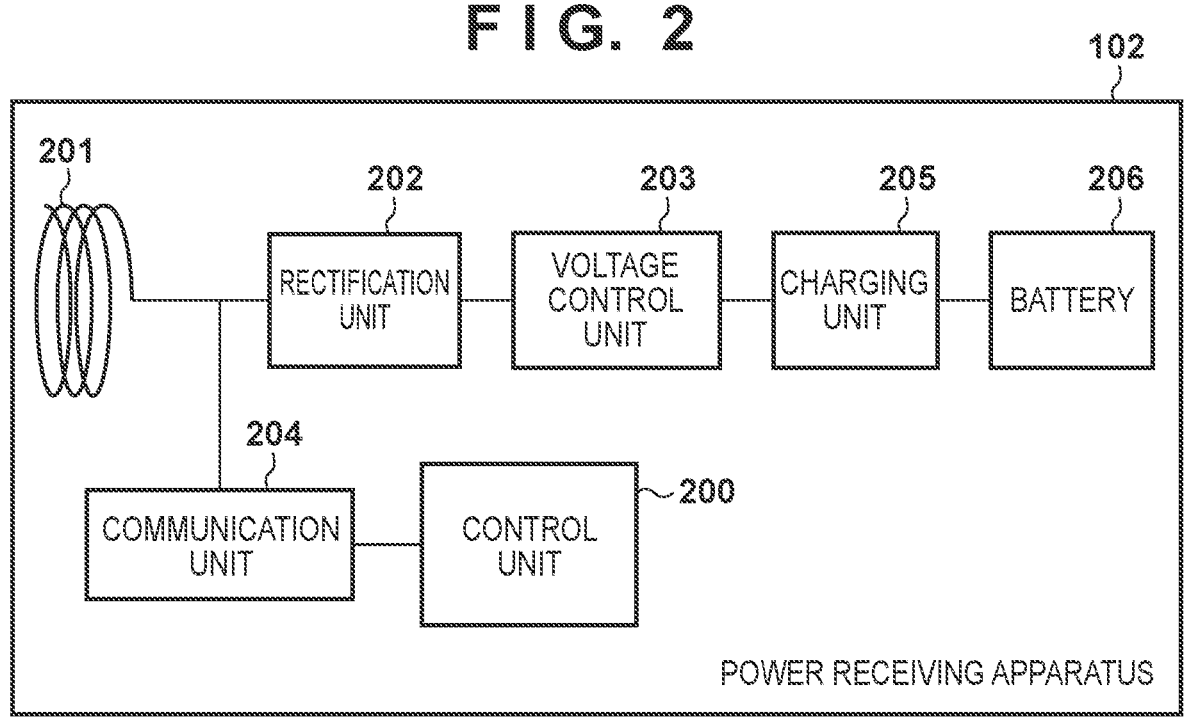
FIG. 2 is a block diagram showing an example of the configuration of a power receiving apparatus.

FIG. 2 is a block diagram showing an example of the configuration of the power receiving apparatus 102. A control unit 200 controls the entire power receiving apparatus 102. As an example, the control unit 200 includes one or more CPUs (Central Processing Units). A power receiving coil 201 receives power from the power transmission coil 304 (FIG. 3) of the power transmission apparatus 100. A rectification unit 202 converts an AC voltage and an AC current from the power transmission coil 304 (FIG. 3) received via the power receiving coil 201 into a DC voltage and a DC current. A voltage control unit 203 converts the level of the DC voltage input from the rectification unit 202 into a level of the DC voltage with which the control unit 200, a charging unit 205, and the like operate. The voltage control unit 203 also supplies the voltage of the converted level to the charging unit 205. The charging unit 205 charges a battery 206. A communication unit 204 performs control communication of wireless charge based on WPC standard with respect to a communication unit 305 (FIG. 3) of the power transmission apparatus 100. The control communication is implemented by load-modulating the AC voltage and the AC current received by the power receiving coil 201.

Figure 3:
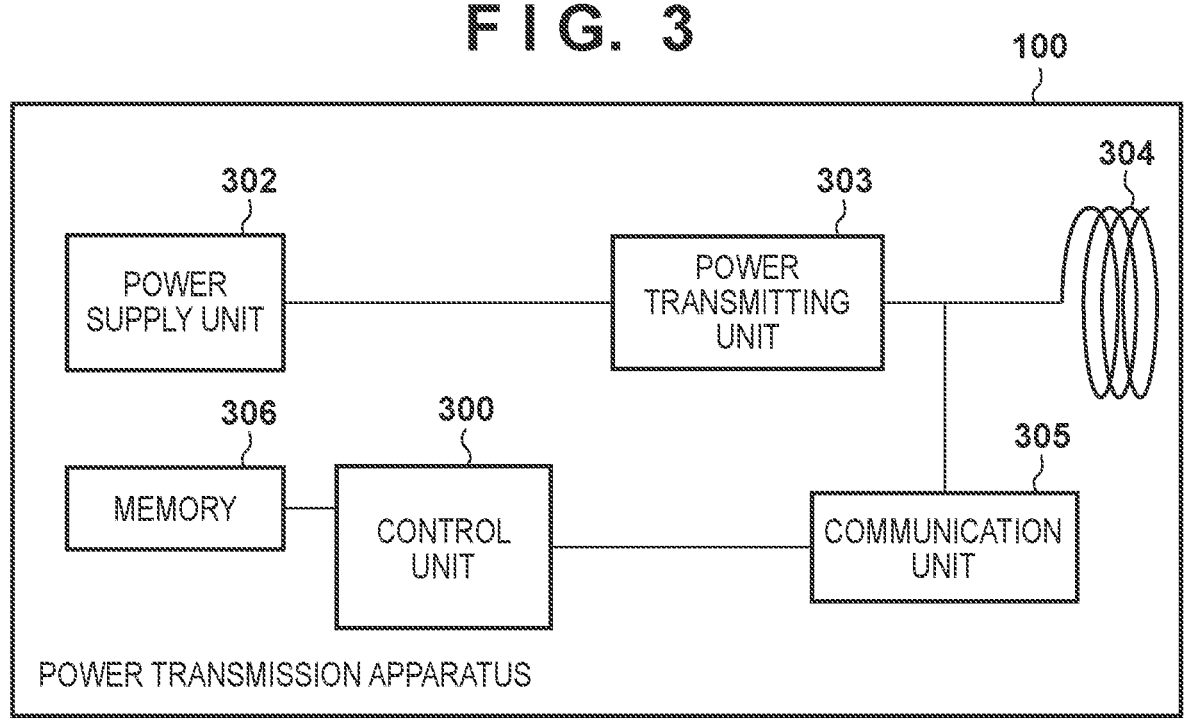
FIG. 3 is a block diagram showing an example of the configuration of a power transmission apparatus.

FIG. 3 is a block diagram showing an example of the configuration of the power transmission apparatus 100, and a control unit 300 controls the entire power transmission apparatus 100. As an example, the control unit 300 includes one or more CPUs. A power supply unit 302 supplies power to each functional block. The power supply unit 302 is, for example, a commercial power supply or a battery. The battery can store power supplied from the commercial power supply. A power transmitting unit 303 converts DC or AC power input from the power supply unit 302 into AC power in a frequency band to be used for wireless power transmission, and inputs the AC power to the power transmission coil 304, thereby generating an electromagnetic wave to be received by the power receiving apparatus 102. For example, the power transmitting unit 303 converts a DC voltage supplied from the power supply unit 302 into an AC voltage by a switching circuit having a half bridge or full bridge configuration using an FET (Field Effect Transistor). In this case, the power transmitting unit 303 includes a gate driver that ON/OFF-controls the FET.

Also, the power transmitting unit 303 adjusts one or both of the voltage (transmission voltage) and the current (transmission current) input to the power transmission coil 304 or a frequency, thereby controlling the intensity of the electromagnetic wave to be output. When the transmission voltage or the transmission current is made large, the intensity of the electromagnetic wave increases. When the transmission voltage or the transmission current is made small, the intensity of the electromagnetic wave decreases. In addition, based on an instruction from the control unit 300, the power transmitting unit 303 controls the power transmitting unit 303 to start or stop the power transmission coil 304 and controls the output of AC power. Also, the power transmitting unit 303 has a capability of supplying power to output power of 15 watt (W) to the charging unit 205 (FIG. 2) of the power receiving apparatus 102 corresponding to the WPC standard.

A communication unit 305 performs communication for power transmission control based on the WPC standard with respect to the power receiving apparatus 102 via the power transmission coil 304. The communication unit 305 performs frequency modulation (FSK (Frequency Shift Keying)) of an AC voltage and an AC current output from the power transmitting unit 303 and transmits the information to the power receiving apparatus 102. In addition, the communication unit 305 demodulates an AC voltage and an AC current modulated by the communication unit 204 (FIG. 2) of the power receiving apparatus 102, thereby obtaining information transmitted from the power receiving apparatus 102. That is, communication performed by the communication unit 305 is performed by superimposing a signal on the electromagnetic wave transmitted from the power transmitting unit 303. Also, the communication unit 305 may communicate with the power receiving apparatus 102 by communication using a coil (or antenna) different from the power transmission coil 304 and based on a standard different from the WPC standard, or may communicate with the power receiving apparatus 102 by selectively using a plurality of communications.

A memory 306 stores a control program and can also store the states of the power transmission apparatus 100 and the power receiving apparatus 102. For example, the state of the power transmission apparatus 100 is obtained by the control unit 300, the state of the power receiving apparatus 102 is obtained by the control unit 200 (FIG. 2), and the states can be received via the communication unit 305.

Figure 4:
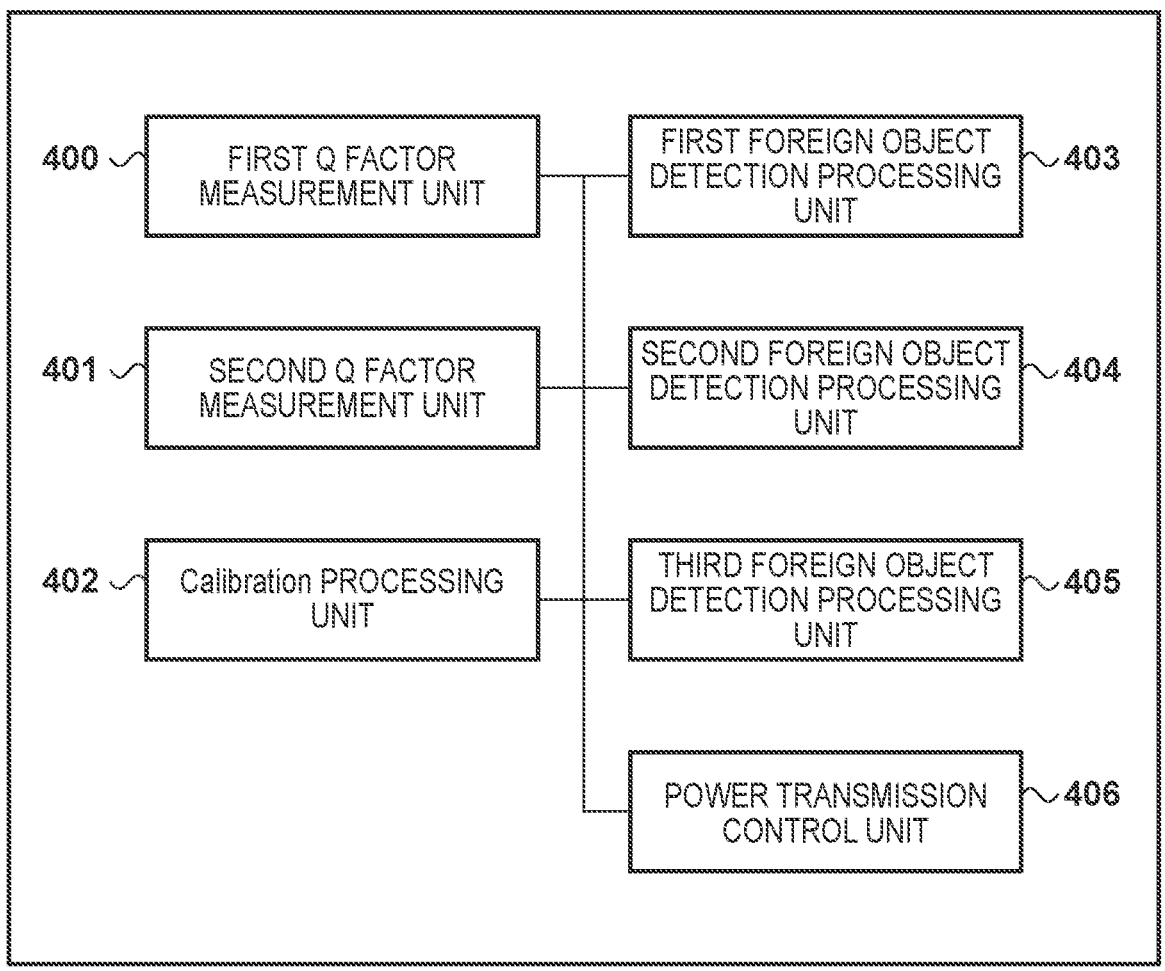
FIG. 4 is a block diagram showing an example of the functional configuration of the control unit of the power transmission apparatus.

FIG. 4 is a block diagram showing the functional configuration of the control unit 300 of the power transmission apparatus 100 according to this embodiment. A first Q factor measurement unit 400 performs measurement of a Q factor in a frequency domain (first Q factor measurement), as will be described later. A second Q factor measurement unit 401 performs measurement of a Q factor in a time domain (second Q factor measurement), as will be described later. A Calibration processing unit 402 performs obtaining of a Calibration data Point and Calibration curve creation processing, as will be described later. A first foreign object detection processing unit 403 performs foreign object detection processing (first foreign object detection processing) based on a first Q factor measured by the first Q factor measurement unit 400. A second foreign object detection processing unit 404 performs foreign object detection processing (second foreign object detection processing) based on a power loss method to be described later. A third foreign object detection processing unit 405 performs foreign object detection processing (third foreign object detection processing) based on a second Q factor measured by the second Q factor measurement unit 401. A power transmission control unit 406 performs processing concerning power transmission start, power transmission stop, and increase/decrease of transmission power in the power transmitting unit 303 (FIG. 3). The processing units shown in FIG. 4 are each configured as an independent program, and can operate concurrently while making synchronization between the programs by event processing or the like. Note that a foreign object is, for example, a conductive member such as a metal piece, and is an object different from the power receiving apparatus. In addition, foreign object detection processing is processing of determining the presence/absence of an object different from the power receiving apparatus.

As foreign object detection methods defined by the WPC (Wireless Power Consortium) standard, a foreign object detection method (first foreign object detection method) based on a Q factor measured in the frequency domain and a foreign object detection method (second foreign object detection method) based on a power loss method will be described next. A description will be made below using the power transmission apparatus 100 and the power receiving apparatus 102 as an example.

(Foreign Object Detection Method)
(1) Foreign Object Detection Method Based on Q Factor Measured in Frequency Domain (First Foreign Object Detection Method)

First, the power transmission apparatus 100 measures, in the frequency domain, a Q factor that changes due to the influence of a foreign object (first Q factor measurement). This measurement is executed after the power transmission apparatus 100 transmits an Analog Ping until a Digital Ping is transmitted (see first Q factor measurement (F501) in FIG. 5A). More specifically, to measure the Q factor, the power transmitting unit 303 sweeps the frequency of wireless power output from the power transmission coil 304, and the first Q factor measurement unit 400 measures the voltage value at the terminal portion of a resonance capacitor (not shown) connected in series (or in parallel) with the power transmission coil. The first Q factor measurement unit 400 searches for a resonance frequency at which the voltage value exhibits a peak, and calculates the Q factor of the power transmission coil 304 from the resonance frequency and a frequency indicating a voltage value lower by 3 dB than the peak voltage value (measured at the resonance frequency).

The Q factor may be measured by another method. For example, the power transmitting unit 303 sweeps the frequency of wireless power output from the power transmission coil 304, and the first Q factor measurement unit 400 measures the voltage value at the terminal portion of a resonance capacitor (not shown) connected in series with the power transmission coil 304, and searches for a resonance frequency at which the voltage value exhibits a peak. Then, the first Q factor measurement unit 400 measures the voltage values at the two terminals of the resonance capacitor at the resonance frequency, and calculates the Q factor of the power transmission coil 304 based on the ratio of the voltage values at the two terminals.

After the Q factor of the power transmission coil 304 is calculated, the first foreign object detection processing unit 403 of the power transmission apparatus 100 obtains a Q factor serving as the judgement criterion of foreign object detection from the power receiving apparatus 102 via the communication unit 305. More specifically, the first foreign object detection processing unit 403 receives the Q factor (first characteristic value) of the power transmission coil in a case where the power receiving apparatus is placed on the power transmission coil, which is defined by the WPC standard, from the power receiving apparatus 102 as a reference value. The Q factor is stored in an FOD (Foreign Object Detection) Status packet received from the power receiving apparatus 102. The first foreign object detection processing unit 403 estimates, from the Q factor stored in the FOD Status packet, the Q factor of the power transmission coil 304 in a case where the power receiving apparatus 102 is placed on the power transmission apparatus 100. In this embodiment, the estimated Q factor will be expressed as a first reference Q factor. Note that the Q factor (corresponding to Q1 to be described later) stored in the FOD Status packet is stored in the nonvolatile memory (not shown) of the power receiving apparatus 102 in advance.

The, the first foreign object detection processing unit 403 of the power transmission apparatus 100 compares the first reference Q factor with the Q factor measured by the first Q factor measurement unit 400, and determines the presence/absence of a foreign object based on the comparison result. More specifically, using a Q factor lower by a % (first ratio) than the first reference Q factor as a threshold, if the measured Q factor is lower than the threshold, the first foreign object detection processing unit 403 determines that the possibility of presence of a foreign object is high, and otherwise, determines that the possibility of absence of a foreign object is high.

(2) Foreign Object Detection Method Based on Power Loss Method (Second Foreign Object Detection Method)

Figure 12:
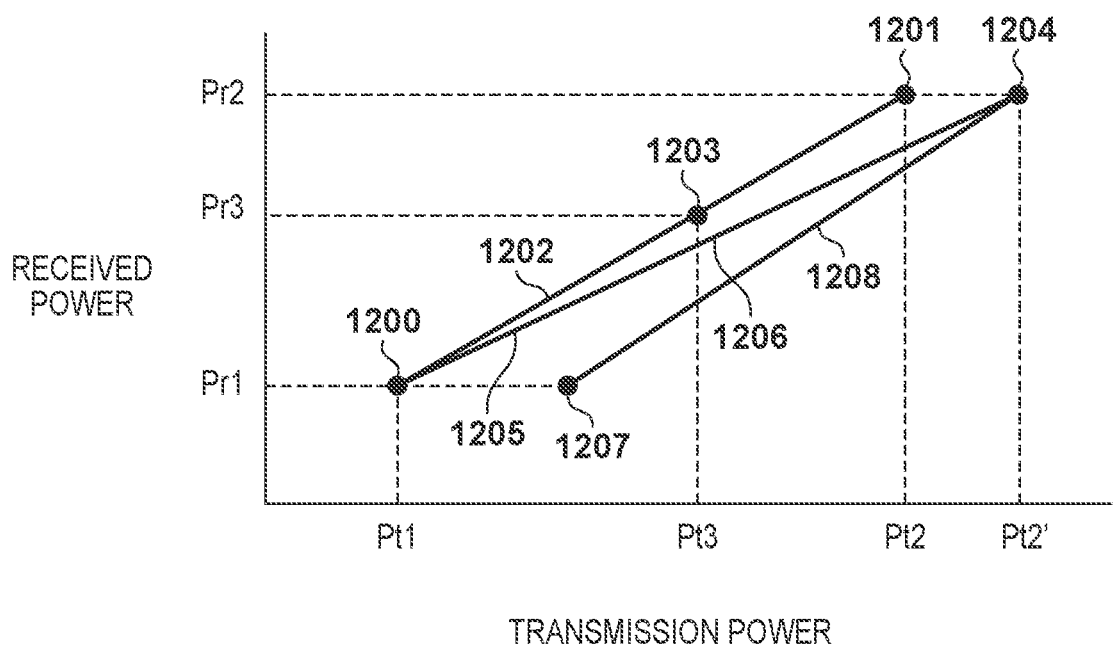
FIG. 12 is a conceptual view of foreign object detection by a power loss method.

A foreign object detection method based on the power loss method defined by the WPC standard will be described next with reference to FIG. 12. FIG. 12 is a conceptual view of foreign object detection by the power loss method. The abscissa represents transmission power of the power transmission apparatus 100, and the ordinate represents received power of the power receiving apparatus 102. Note that control of transmission power by the power transmitting unit 303 of the power transmission apparatus 100 is performed by the power transmission control unit 406.

First, the power transmitting unit 303 of the power transmission apparatus 100 transmits Digital Ping to the power receiving apparatus 102, and the communication unit 305 receives a received power value Pr1 (called Light Load) in the power receiving apparatus 102 by a Received Power Packet (mode1). Note that in the following description, the Received Power Packet (mode1) will be expressed as RP1. At this time, the power receiving apparatus 102 does not supply the received power to loads (the charging unit 205 and the battery 206). The control unit 300 of the power transmission apparatus 100 stores, in the memory 306, the relationship (created point 1200) between Pr1 and the transmission power value Pt1 at that time. Accordingly, the power transmission apparatus 100 can recognize that the power loss amount between the power transmission apparatus 100 and the power receiving apparatus 102 when Pt1 is transmitted as the transmission power is Pt1−Pr1 (Ploss1).

Next, the communication unit 305 of the power transmission apparatus 100 receives, from the power receiving apparatus 102, the value of a received power value Pr2 (called Connected Load) in the power receiving apparatus 102 by a Received Power Packet (mode2). Note that in the following description, the Received Power Packet (mode2) will be expressed as RP2. At this time, the power receiving apparatus 102 supplies the received power to the loads. The control unit 300 of the power transmission apparatus 100 stores, in the memory 306, the relationship (created point 1201) between Pr2 and a transmission power value Pt2 at that time. Accordingly, the power transmission apparatus 100 can recognize that the power loss amount between the power transmission apparatus and the power receiving apparatus when Pt2 is transmitted as the transmission power is Pt2−Pr2 (Ploss2).

The Calibration processing unit 402 of the power transmission apparatus 100 linearly interpolates the points 1200 and 1201, thereby creating a line 1202. The line 1202 represents the relationship between the transmission power and the received power in a state in which no foreign object exists around the power transmission apparatus 100 and the power receiving apparatus 102. Hence, the power transmission apparatus 100 can predict, from the transmission power value and the line 1202, received power in a state in which the possibility of absence of a foreign object is high. For example, if the transmission power value is Pt3, the received power value can be predicted as Pr3 from a point 1203 on the line 1202 where the transmission power value corresponds to Pt3.

Here, assume that when the power transmitting unit 303 of the power transmission apparatus 100 transmits power to the power receiving apparatus 102 by the transmission power Pt3, the communication unit 305 receives a received power value Pr3' from the power receiving apparatus 102. The second foreign object detection processing unit 404 of the power transmission apparatus 100 calculates Pr3-Pr3' (=Ploss_FO) that is a value obtained by subtracting the received power value Pr3' actually received from the power receiving apparatus 102 from the received power value Pr3 in a state in which a foreign object does not exist. Ploss_FO can be considered as a power loss consumed by a foreign object when the foreign object exists between the power transmission apparatus 100 and the power receiving apparatus 102. Hence, if the power Ploss_FO that would be consumed by the foreign object exceeds a predetermined threshold, the second foreign object detection processing unit 404 can judge that a foreign object exists. The threshold can be derived based on the relationship between the point 1200 and the point 1201.

Alternatively, the second foreign object detection processing unit 404 of the power transmission apparatus 100 obtains, in advance, a power loss amount Pt3-Pr3 (Ploss3) between the power transmission apparatus 100 and the power receiving apparatus 102 from the received power value Pr3 in a state in which a foreign object does not exist. Next, the second foreign object detection processing unit 404 obtains a power loss amount Pt3-Pr3' (Ploss3') between the power transmission apparatus 100 and the power receiving apparatus 102 in a state in which a foreign object exists from the received power value Pr3' received from the power receiving apparatus 102 in a state in which a foreign object exists. Then, the second foreign object detection processing unit 404 may obtain the power Ploss_FO that would be consumed by the foreign object by Ploss3'-Ploss3 (=Ploss_FO).

As described above, the power Ploss_FO that would be consumed by the foreign object may be obtained as Pr3-Pr3'(=Ploss_FO) or as Ploss3'-Ploss3 (=Ploss_FO).

After the line 1202 is obtained by the Calibration processing unit 402, the second foreign object detection processing unit 404 of the power transmission apparatus 100 periodically receives the current received power value (for example, Pr3' described above) from the power receiving apparatus 102 via the communication unit 305. The current received power value periodically transmitted from the power receiving apparatus 102 is transmitted as a Received Power Packet (mode0) to the power transmission apparatus 100. The second foreign object detection processing unit 404 of the power transmission apparatus 100 performs foreign object detection based on the line 1202 and the received power value stored in the Received Power Packet (mode0). Note that in the following description, the Received Power Packet (mode0) will be expressed as RP0.

Note that in this embodiment, the points 1200 and 1201 used to obtain the line 1202 representing the relationship between the transmission power and the received power in a state in which a foreign object does not exist around the power transmission apparatus 100 and the power receiving apparatus 102 will be expressed as Calibration data Points. In addition, a line segment (line 1202) obtained by interpolating at least two Calibration data Points will be expressed as a Calibration curve. The Calibration data Points and the Calibration curve (second reference) are used for foreign object detection processing by the second foreign object detection processing unit 404.

(Q Factor Measuring Method in Time Domain)

Figure 11A:
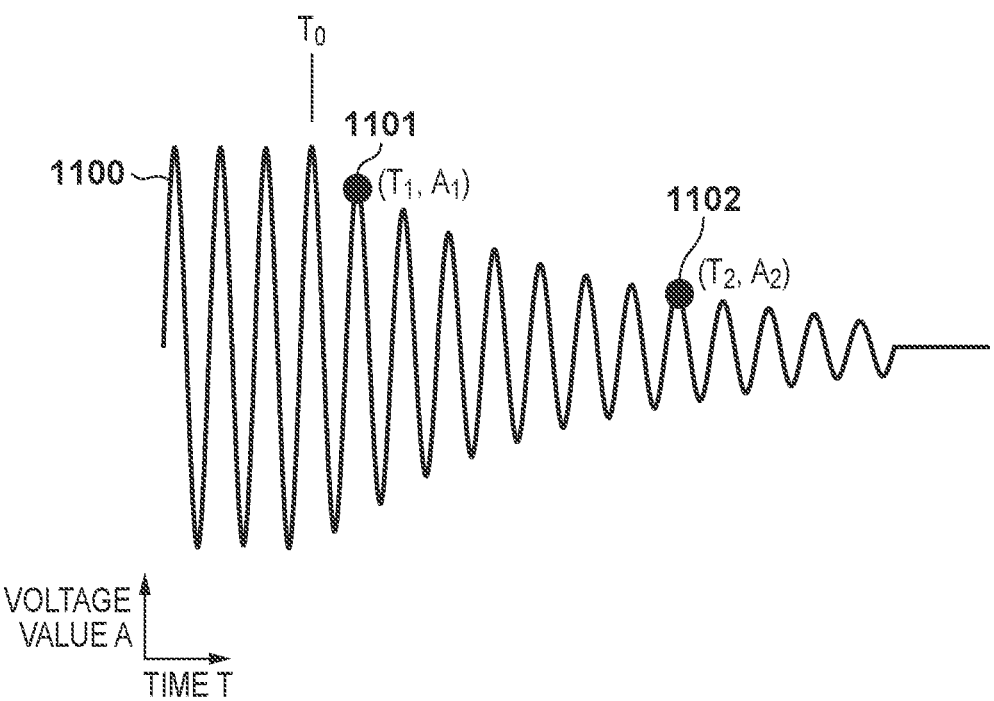
FIG. 11A is a conceptual view for explaining a Q factor measuring method in a time domain.
Figure 11B:
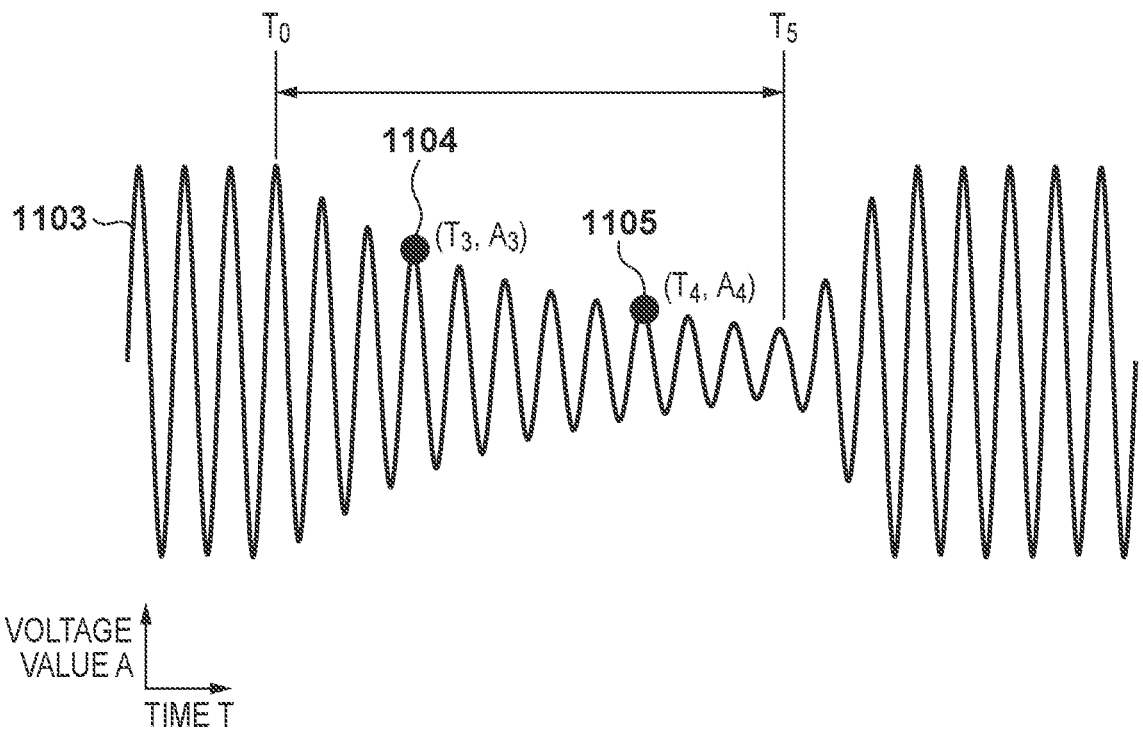
FIG. 11B is a conceptual view for explaining a Q factor measuring method in a time domain.

A Q factor measuring method in a time domain will be described next with reference to FIGS. 11A and 11B. FIGS. 11A and 11B are conceptual views for explaining a method of measuring a Q factor in a time domain (second Q factor measurement). This description is based on a technique disclosed in PTL 2. In this embodiment, a foreign object detection method based on the second Q factor will be expressed as a third foreign object detection method. The second Q factor measurement is performed by the second Q factor measurement unit 401. Also, control of transmission power by the power transmitting unit 303 of the power transmission apparatus 100 is performed by the power transmission control unit 406.

A waveform 1100 shown in FIG. 11A represents the elapsed time of the value of a high-frequency voltage (to be simply referred to as the voltage value of the power transmission coil hereinafter) applied to the power transmission coil 304 of the power transmission apparatus 100 or a terminal portion of a resonance capacitor (not shown). The abscissa represents time, and the ordinate represents the voltage value. At time $T_0$, application of the high-frequency voltage (power transmission) is stopped. A point 1101 is a point on the envelope (transmission power waveform) of the high-frequency voltage, and represents the high-frequency voltage at time $T_1$. In FIG. 11A, ($T_1$, $A_1$) represents that the voltage value at time $T_1$ is $A_1$. Similarly, a point 1102 is a point on the envelope (transmission power waveform) of the high-frequency voltage, and represents the high-frequency voltage at time $T_2$. In FIG. 11A, ($T_2$, $A_2$) represents that the voltage value at time $T_2$ is $A_2$. The transmission power waveform here is the waveform of the voltage applied to the power transmission coil with respect to time. Note that the transmission power waveform may be the waveform of a current flowing to the power transmission coil with respect to time.

Q factor measurement is executed based on the time-rate change of the voltage value from time $T_0$. More specifically, based on the times and the voltage values of the points 1101 and 1102 as the envelope of the voltage value, and a frequency f (to be referred to as an operating frequency hereinafter) of the high-frequency voltage, the Q factor is calculated by $$Q = \pi f \frac{T_2 - T_1}{\ln\left(\frac{A_1}{A_2}\right)} \quad (1)$$

Next, processing of the power transmission apparatus 100 measuring the Q factor in the time domain in this embodiment will be described with reference to FIG. 11B. A waveform 1103 represents the value of a high-frequency voltage applied to the power transmission coil 304, and its frequency falls within the range of 110 kHz to 148.5 kHz, which is used in the WPC standard. Also, each of points 1104 and 1105 is a part of the envelope of the voltage value. The power transmitting unit 303 of the power transmission apparatus 100 stops power transmission in the section from time $T_0$ to $T_5$. The second Q factor measurement unit 401 of the power transmission apparatus 100 measures the Q factor based on a voltage value $A_3$ (point 1104) at time $T_3$, a voltage value $A_4$ (point 1105) at time $T_4$, the operating frequency of the high-frequency voltage, and equation (1). Note that the power transmitting unit 303 of the power transmission apparatus 100 resumes power transmission at time $T_5$. As described above, the second Q factor measurement is implemented by the power transmission apparatus 100 instantaneously disconnecting power transmission, and measuring the Q factor based the elapsed times and the voltage values, and the operating frequency.

(Operations of Power Transmission Apparatus and Power Receiving Apparatus (Conventional Technique))

The operations of the power transmission apparatus 100 and the power receiving apparatus 102 in a conventional technique will be described with reference to FIG. 5A. FIG. 5A is a sequence chart for explaining the operations of the power transmission apparatus 100 and the power receiving apparatus 102 in a conventional technique. In the description of FIG. 5A, it is assumed that the power transmission apparatus 100 and the power receiving apparatus 102 are a power transmission apparatus and a power receiving apparatus, which comply with the WPC standard v1.2.3.

The power transmission apparatus 100 transmits an Analog Ping to detect an object existing near the power transmission coil 304 (F500). The Analog Ping is pulse-shaped power, and is power used to detect an object. Even if the power receiving apparatus 102 receives the Analog Ping, this power is too small to activate the control unit 200 of the power receiving apparatus 102. The power transmission apparatus 100 detects an object based on a shift of the resonance frequency of the voltage value in the power transmission coil 304, which is caused by an object existing near the power transmission coil 304, or a change of the voltage value/current value flowing to the power transmission coil 304. Upon detecting an object by the Analog Ping, the power transmission apparatus 100 measures the Q factor of the power transmission coil by the above-described first Q factor measurement (F501). Next to the first Q factor measurement, the power transmission apparatus 100 starts transmission of a Digital Ping (F502). The Digital Ping is power used to activate the control unit 200 of the power receiving apparatus 102, and is power larger than the Analog Ping. The Digital Ping is transmitted continuously from then on. That is, the power transmission apparatus 100 continuously transmits power equal to or larger than the Digital Ping after the start of transmission of the Digital Ping (F502) until reception of an EPT (End Power Transfer) packet from the power receiving apparatus 102 (F522).

When activated by receiving the Digital Ping, the power receiving apparatus 102 transmits a Signal Strength that is a packet storing the voltage value of the received Digital Ping to the power transmission apparatus 100. Next, the power receiving apparatus 102 transmits a packet storing the version information of the WPC standard with which the power receiving apparatus 102 complies and an ID including device identification information (F504). Furthermore, the power receiving apparatus 102 transmits, to the power transmission apparatus 100, a Configuration packet including information including the maximum value of power to be supplied from the voltage control unit 203 to the load (charging unit 205) (F505). Upon receiving the ID and the Configuration packet and thus judging that the power receiving apparatus 102 supports an extension protocol (including Negotiation to be described later) after the WPC standard v1.2, the power transmission apparatus 100 responds by an ACK (F506).

The power receiving apparatus 102 receives the ACK and transits to a Negotiation phase to negotiate about power to be transmitted/received. First, the power receiving apparatus 102 transmits an FOD Status packet to the power transmission apparatus 100 (F507). In this embodiment, the FOD Status packet will be expressed as FOD(Q1). The power transmission apparatus 100 performs foreign object detection by the first foreign object detection method based on the Q factor stored in the received FOD(Q1) (the Q factor measured in the frequency domain) and the Q factor measured by the first Q factor measurement, and transmits an ACK representing that the possibility of absence of a foreign object is high to the power receiving apparatus 102 (F508).

Upon receiving the ACK, the power receiving apparatus 102 negotiates about Guaranteed Power (GP) that is the maximum value of the power value that the power receiving apparatus 102 request to receive. More specifically, the Guaranteed Power represents the load power of the power receiving apparatus 102 (power to be consumed by the battery 206), which is agreed between the power transmission apparatus 100 and the power receiving apparatus 102. This negotiation is implemented by transmitting, to the power transmission apparatus 100, a packet storing the value of Guaranteed Power requested by the power receiving apparatus 102 in a Specific Request defined by the WPC standard (F509). In this embodiment, the packet will be expressed as SRQ(GP).

The power transmission apparatus 100 responds to the SRQ(GP) in consideration of the power transmission capability of its own, and the like. The power transmission apparatus 100 judges that the Guaranteed Power is acceptable, and transmits an ACK representing that the request is accepted (F510). In this embodiment, assume that the power receiving apparatus 102 requests 15 W as the Guaranteed Power by SRQ(GP).

When negotiation of a plurality of parameters including Guaranteed Power is ended, the power receiving apparatus 102 transmits, to the power transmission apparatus, SRQ (EN) that requests the end of negotiation (End Negotiation) in the Specific Request (F511). The power transmission apparatus 100 transmits an ACK to the SRQ(EN) (F512), and the negotiation, and transits to a Power Transfer phase to transmit/receive power defined by the Guaranteed Power.

Next, the power transmission apparatus 100 executes foreign object detection (second foreign object detection method) based on the above-described power loss method (F513 to F521). First, the power transmission apparatus 100 receives RP1 (Received Power Packet (mode1)) from the power receiving apparatus 102 (F513). The power transmission apparatus 100 transmits, to the power receiving apparatus, an ACK representing that the received power value stored in RP1 and the transmission power value of the power transmission apparatus 100 at that time are accepted as a Calibration data Point (corresponding to the point 1200 in FIG. 12) (F514).

After reception of the ACK, the power receiving apparatus 102 transmits, to the power transmission apparatus 100, Control Error (to be expressed as CE hereinafter) requesting the power transmission apparatus 100 to increase/decrease the received voltage (or received current or received power). The CE stores a sign and a numerical value. If the sign is plus, it means that the power is increased. If the sign is minus, it means that the power is decreased. If the numerical value is zero, it means that the power is requested to be maintained. Here, the power receiving apparatus 102 transmits CE(+) representing that the power is increased to the power transmission apparatus 100 (F515).

Upon receiving CE(+), the power transmission apparatus 100 changes the set value of the power transmitting unit 303 to increase the transmission power (F516). When the received power increases in response to CE(+), the power receiving apparatus 102 supplies the received power to the loads (the charging unit 205 and the battery 206), and transmits the RP2 (Received Power Packet (mode2)) to the power transmission apparatus 100 (F517). The power transmission apparatus 100 transmits, to the power receiving apparatus, an ACK representing that the received power value stored in RP2 and the transmission power value of the power transmission apparatus 100 at that time are accepted as a Calibration data Point (corresponding to the point 1201 in FIG. 12) (F518). Since the power transmission apparatus has created (obtained) two Calibration data Points (the points 1200 and 1201 in FIG. 12) at this point of time, a Calibration curve (corresponding to the line 1202 in FIG. 12) can be created (derived).

The power transmission apparatus 100 and the power receiving apparatus 102 have transited to the Power Transfer phase, and the power transmission apparatus 100 is transmitting the power that enables the power receiving apparatus 102 to receive the maximum power of 15 W negotiated in the Negotiation phase. To the power transmission apparatus 100, the power receiving apparatus 102 periodically transmits, to the power transmission apparatus 100, the RP0 (Received Power Packet (mode0)) storing the CE and the current received power value (F519 and F520).

Upon receiving the RP0 from the power receiving apparatus 102, the power transmission apparatus 100 performs foreign object detection based on the above-described second foreign object detection method. Upon determining, as the result of foreign object detection, that the possibility of absence of a foreign object is high, the power transmission apparatus 100 transmits an ACK to the power receiving apparatus 102 (F521).

When charging of the battery 206 is ended, the power receiving apparatus 102 transmits an EPT (End Power Transfer) packet that requests stop of power transmission to the power transmission apparatus 100 (F522). The procedure of control of the power transmission apparatus 100 and the power receiving apparatus 102, which comply with the WPC standard v1.2.3, has been described above.

(Problems Concerning First Foreign Object Detection Method and Second Foreign Object Detection Method)

The sequence chart shown in FIG. 5A has problems in foreign object detection. For example, as for the first foreign object detection method, if a foreign object is placed in the Operating Volume (the range affected by wireless power transmitted by the power transmission apparatus 100) after the power transmission apparatus 100 executes the first Q factor measurement (F501) until the Calibration data Point is obtained (for example, until the ACK is transmitted in F514), the foreign object 103 cannot be detected. This is because in the first foreign object detection method, only the presence/absence of a foreign object at the time of execution of first Q factor measurement (F501) is determined at the time of reception of FOD(Q1).

Also, as for the second foreign object detection method, if a foreign object is placed in the Operating Volume after the power transmission apparatus 100 obtains the first Calibration data Point (point 1200) by transmitting the ACK in F514 until the power transmission apparatus 100 creates the next Calibration data Point (point 1201) and the Calibration curve (line 1202) by transmitting the ACK in F518, the foreign object 103 cannot be detected. For example, assume a case where immediately after the power receiving apparatus 102 transmits CE(+) in F515, a foreign object is placed in the Operating Volume. The power receiving apparatus 102 transmits the RP2 in F517. Since Calibration data Point data has not been created at this point of time, the foreign object cannot be detected based on second foreign object detection processing. First foreign object detection processing is not performed, either, as a matter of course.

Furthermore, since the power transmission apparatus 100 obtains the Calibration data Point in a state in which the foreign object exists, it is impossible to correctly perform second foreign object detection processing. This will be described in detail with reference to FIG. 12. Since the foreign object exists at this time, the transmission power of the power transmission apparatus 100 is Pt2'(≠Pt2) that is a value obtained by adding power to be consumed by the foreign object to the transmission power (Pt2) to the power receiving apparatus 102. Hence, the power transmission apparatus 100 creates (obtains) and stores a point 1204 as a Calibration data Point. As a result, the power transmission apparatus 100 creates a line 1206 as a Calibration curve. The Calibration curve should be created without a foreign object. Since the line 1206 is a Calibration curve created in a state in which the possibility of presence of a foreign object is high, correct foreign object detection cannot be performed using the second foreign object detection method.

In addition, if the foreign object 103 is placed in the Operating Volume after the power transmission apparatus 100 executes first Q factor measurement (F501) until the power transmission apparatus 100 creates the first Calibration data Point (point 1200) by transmitting the ACK in F514, correct foreign object detection cannot be performed using the second foreign object detection method. This is because the point 1200 is a Calibration data Point created in a state in which the possibility of presence of a foreign object is high.

(Explanation of Operation in Case where Third Foreign Object Detection Method is Applied to WPC Standard)

In foreign object detection (first foreign object detection method) based on a Q factor (first Q factor) measured in the frequency domain, the frequency needs to be swept to search for a resonance frequency every time the measurement is performed. Performing the first foreign object detection method and sweeping the frequency during transmission of relatively large power for the Digital Ping or the Power Transfer phase by the power transmission apparatus 100 undesirably cause an increase of switching noise in the power transmitting unit 303.

On the other hand, foreign object detection (third foreign object detection method) based on a Q factor (second Q factor) measured in the time domain can be executed using a single frequency, and the frequency need not be swept. For this reason, the method can be executed at the operating frequency during power transmission for the Digital Ping or the Power Transfer phase, and the influence on switching noise is little. An operation in a case where the third foreign object detection method is applied to the WPC standard will be described below.

(1) Reference Creation Processing

Figure 6A:
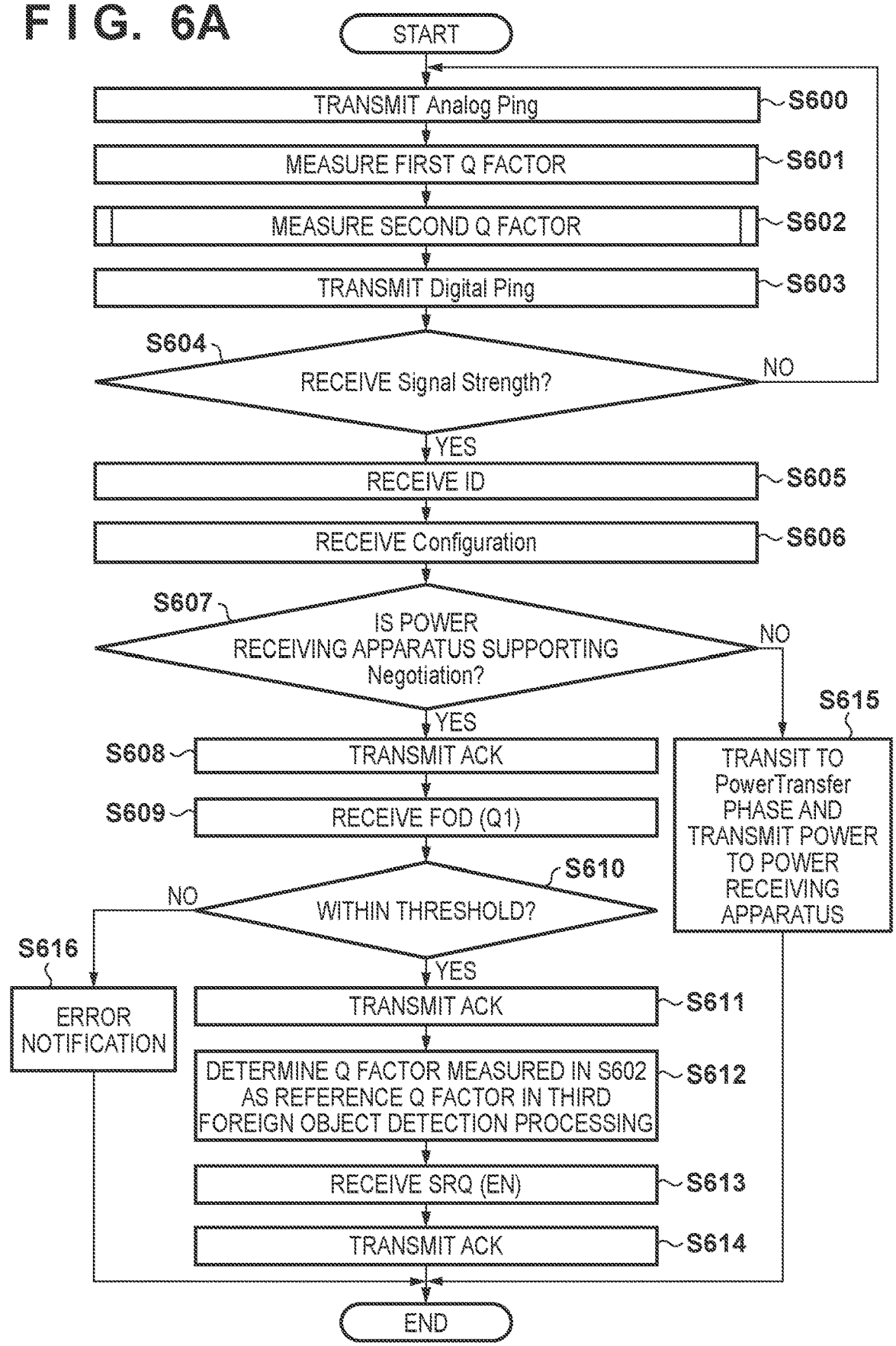
FIG. 6A is a flowchart showing creation processing of a reference Q factor in a case where a third foreign object detection method is applied to the WPC standard.

When applying the third foreign object detection method based on the second Q factor to the WPC standard, a reference Q factor used to determine the presence/absence of a foreign object needs to be created. First, reference Q factor creation processing in the third foreign object detection method will be described with reference to FIG. 6A. FIG. 6A is a flowchart of reference Q factor creation processing for the third foreign object detection method executed by the power transmission apparatus 100.

The power transmitting unit 303 of the power transmission apparatus 100 transmits an Analog Ping (step S600). If the first foreign object detection processing unit 403 detects, by the Analog Ping, that an object exists in the Operating Volume, the first Q factor measurement unit 400 performs first Q factor measurement (step S601). Immediately after the first Q factor measurement, the second Q factor measurement unit 401 of the power transmission apparatus 100 performs second Q factor measurement (step S602). Here, "immediately after" means that no processing is performed between the first Q factor measurement (step S601) and the second Q factor measurement (step S602). The reason why "immediately after" is set is that the second Q factor measurement should be performed under almost the same condition as the condition of the first Q factor measurement (step S601). Hence, the second Q factor measurement in step S602 may be performed immediately before step S601.

Processing of second Q factor measurement will be described here with reference to FIGS. 8, 11A, and 11B. FIG. 8 is a flowchart of second Q factor measurement processing executed by the power transmission apparatus 100. In FIG. 8, the power transmission control unit 406 temporarily stops power transmission by the power transmitting unit 303 (step S800). The second Q factor measurement unit 401 measures the voltage value $A_3$ of the power transmission coil 304 at time $T_3$ (step S801), and after the elapse of a predetermined time, measures the voltage value $A_4$ of the power transmission coil 304 at time $T_4$ (step S802). Next, the second Q factor measurement unit 401 calculates a Q factor from the operating frequency of transmission power (waveform 1103), and the time and the voltage value based on equation (1) described above (step S803). The power transmission control unit 406 controls to resume power transmission (step S804).

Referring back to FIG. 6A, when the second Q factor measurement unit 401 ends the measurement of the second Q factor, the power transmitting unit 303 transmits a Digital Ping (step S603). Upon receiving a Signal Strength transmitted from the power receiving apparatus 102 (YES in step S604), the communication unit 305 receives an ID and a Configuration packet from the power receiving apparatus 102 (steps S605 and S606). Here, the control unit 300 judges, based on the WPC standard version stored in the ID, with which the power receiving apparatus 102 complies, whether the power receiving apparatus 102 supports Negotiation. If the power receiving apparatus 102 supports Negotiation (YES in step S607), the communication unit 305 transmits an ACK (step S608).

Next, the communication unit 305 receives FOD(Q1) from the power receiving apparatus 102 (step S609). The first foreign object detection processing unit 403 determines a reference Q factor (first reference Q factor) in first foreign object detection based on the Q factor stored in the FOD (Q1). The first foreign object detection processing unit 403 compares the first reference Q factor with the first Q factor measured in step S601, and determines whether the measured first Q factor falls within a threshold. Here, "within a threshold" means that in a case where a Q factor lower by a % than the first reference Q factor is set as a threshold, the measured first Q factor is higher than the threshold (that is, the first Q factor is between the first reference Q factor and the threshold). If the measured first Q factor is within the threshold (YES in step S610), the first foreign object detection processing unit 403 judges, as the result of first foreign object detection processing, that the possibility of absence of a foreign object is high, and transmits an ACK to the power receiving apparatus via the communication unit 305 (step S611).

At this point of time, since the power transmission apparatus 100 determines that no foreign object exists in the Operating Volume at the time of first Q factor measurement in step S601, the possibility of presence of a foreign object is very low even in the second Q factor measurement executed in step S602 immediately after step S601. Hence, the third foreign object detection processing unit 405 determines (sets) the second Q factor measured in step S602 as a reference Q factor (third reference Q factor) in third foreign object detection processing (step S612). Next, the communication unit 305 receives SRQ(EN) from the power receiving apparatus 102 (step S613) and transmits an ACK (step S614), and the power transmission apparatus 100 ends the Negotiation phase.

As described above, upon determining, as the result of first foreign object detection processing, that the first Q factor falls within the threshold (the possibility of absence of a foreign object is high), the power transmission apparatus 100 determines (sets) the reference Q factor (third reference Q factor) for third foreign object detection processing. This can implement appropriate control in a case where the third foreign object detection processing is applied to the operation of WPC. Also, the third reference Q factor used to determine the presence/absence of a foreign object in the third foreign object detection method can be created in the sequence of the WPC standard. Furthermore, since the third reference Q factor in the third foreign object detection processing can be determined in a state in which the possibility of absence of a foreign object is high, more accurate foreign object detection can be performed based on the third foreign object detection processing.

If the communication unit 305 of the power transmission apparatus 100 does not receive a Signal Strength in step S604 (NO in step S604), the power transmitting unit 303 stops the Digital Ping and transmits the Analog Ping again (step S600).

Also, if the first foreign object detection processing unit 403 of the power transmission apparatus 100 judges, in step S610, that the measured first Q factor is not within the threshold (the possibility of presence of a foreign object is high) (NO in step S610), an error notification is made to the user by a notification means (not shown) (step S616), and the processing is ended. This can avoid the problem that the reference Q factor (third reference Q factor) of third foreign object detection processing is determined in a state in which the possibility of presence of a foreign object is high, and third foreign object detection processing cannot correctly be performed.

If the power receiving apparatus 102 does not support Negotiation in step S607 (NO in step S607), the third foreign object detection processing unit 405 does not create the third reference Q factor, the power transmission apparatus 100 transits to the Power Transfer phase under the control of the control unit 300, and the power transmitting unit 303 transmits power to the power receiving apparatus 102 (step S615). Also, the Guaranteed Power may be limited to 5 W. That is, the power transmission apparatus 100 may perform control considering that the power receiving apparatus 102 does not have the Negotiation function, and complies with only Baseline Power Profile defined by the WPC standard, in which the Guaranteed Power is 5 W. In this case, the power transmission apparatus 100 does not perform third foreign object detection processing. This is because if the power receiving apparatus 102 does not support Negotiation, the power receiving apparatus 102 has neither the function of transmitting FOD(Q1) nor the function of first foreign object detection processing, and the power transmission apparatus 100 cannot be guaranteed to determine the third reference Q factor in a state in which the possibility of absence of a foreign object is high. This can avoid the problem that the third reference Q factor is determined in a state in which the possibility of presence of a foreign object is high, and third foreign object detection processing cannot correctly be performed.

Also, the control unit 300 of the power transmission apparatus 100 may judge, by a Neg bit stored in the Configuration packet, that the power receiving apparatus 102 "does not support Negotiation". If the Neg bit is "1", the communication unit 305 of the power transmission apparatus 100 responds to the Configuration packet by an ACK to make the power receiving apparatus 102 transit to the Negotiation phase, and the power transmission apparatus 100 itself also transits to the Negotiation phase. If the Neg bit is "0", the power transmission apparatus 100 transits to the Power Transfer phase. With this, the same effects as described above can be obtained.

(Calibration Processing in Case where Third Foreign Object Detection is Performed)

Calibration processing after the Negotiation phase is ended will be described next. First, third foreign object detection processing will be described with reference to FIG. 9. FIG. 9 is a conceptual view of thresholds in third foreign object detection processing. A threshold 901 indicates a Q factor lower by a % than the reference Q factor (third reference Q factor 900) in third foreign object detection processing. The third foreign object detection processing unit 405 judges that the possibility of absence of a foreign object is high if the measured second Q factor is in a range A between the third reference Q factor 900 and the threshold 901, and judges that the possibility of presence of a foreign object is high if the measured second Q factor is equal to or less than the threshold 901.

FIG. 7 is a flowchart of Calibration processing executed by the power transmission apparatus 100 after the end of the Negotiation phase. When the communication unit 305 of the power transmission apparatus 100 receives the RP1 transmitted from the power receiving apparatus 102 (step S700), the second Q factor measurement unit 401 quickly performs second Q factor measurement (step S701). The processing of second Q factor measurement is the same as shown in FIG. 8. If the measured second Q factor is within the threshold 901 (see FIG. 9), the possibility of presence of a foreign object in the Operating Volume is low at the point of time when the power receiving apparatus 102 measures received power stored in the RP1. This is because the received power stored in RP1 is measured immediately before transmission of RP1 and quickly transmitted by the RP1. Hence, in this case, the third foreign object detection processing unit 405 determines that no foreign object exists when the RP1 is received, and a Calibration data Point is created (YES in step S702), and the communication unit 305 responds to the RP1 by an ACK (step S703). After the ACK response, the Calibration processing unit 402 creates a Calibration data Point corresponding to the RP1. The power transmission apparatus 100 performs the same operation even upon receiving the next RP2. That is, when the RP2 is received (step S704), the second Q factor measurement unit 401 quickly performs second Q factor measurement (step S705). If the measured second Q factor is within the threshold 901, the third foreign object detection processing unit 405 determines that no foreign object exists when the RP2 is received, and a Calibration data Point is created (YES in step S706), and the communication unit 305 responds to the RP2 by an ACK (step S707). After the response by the ACK, the Calibration processing unit 402 creates a Calibration data Point corresponding to the RP2.

If the third foreign object detection processing unit 405 determines, in step S702 or S706, that the possibility of presence of a foreign object is high (NO in step S702 or NO in step S706), the communication unit 305 transmits an NAK representing that a Calibration data Point is not created (step S708), and the processing is ended.

As described above, the power transmission apparatus 100 according to this embodiment performs third foreign object detection processing every time a Calibration data Point is created, and upon judging that the possibility of absence of a foreign object is high, creates a Calibration data Point. On the other hand, upon judging that the possibility of presence of a foreign object is high, the power transmission apparatus 100 does not create a Calibration data Point. This can solve the problem that second foreign object detection processing cannot correctly be performed because of creation of a Calibration data Point and a Calibration curve in a state in which the possibility of presence of a foreign object is high.

As the problem of second foreign object detection processing, if the foreign object 103 is placed in the Operating Volume after the power transmission apparatus 100 executes first Q factor measurement (step S501) until a Calibration data Point is created (for example, until an ACK is transmitted in step S514), the foreign object cannot be detected. By the processing shown in FIG. 7, the power transmission apparatus 100 performs foreign object detection based on third foreign object detection processing when creating a Calibration data Point. Hence, this problem is solved, and even in the above-described case, a foreign object can be detected.

(Operations of Power Transmission Apparatus and Power Receiving Apparatus According to this Embodiment)

Figure 5B:
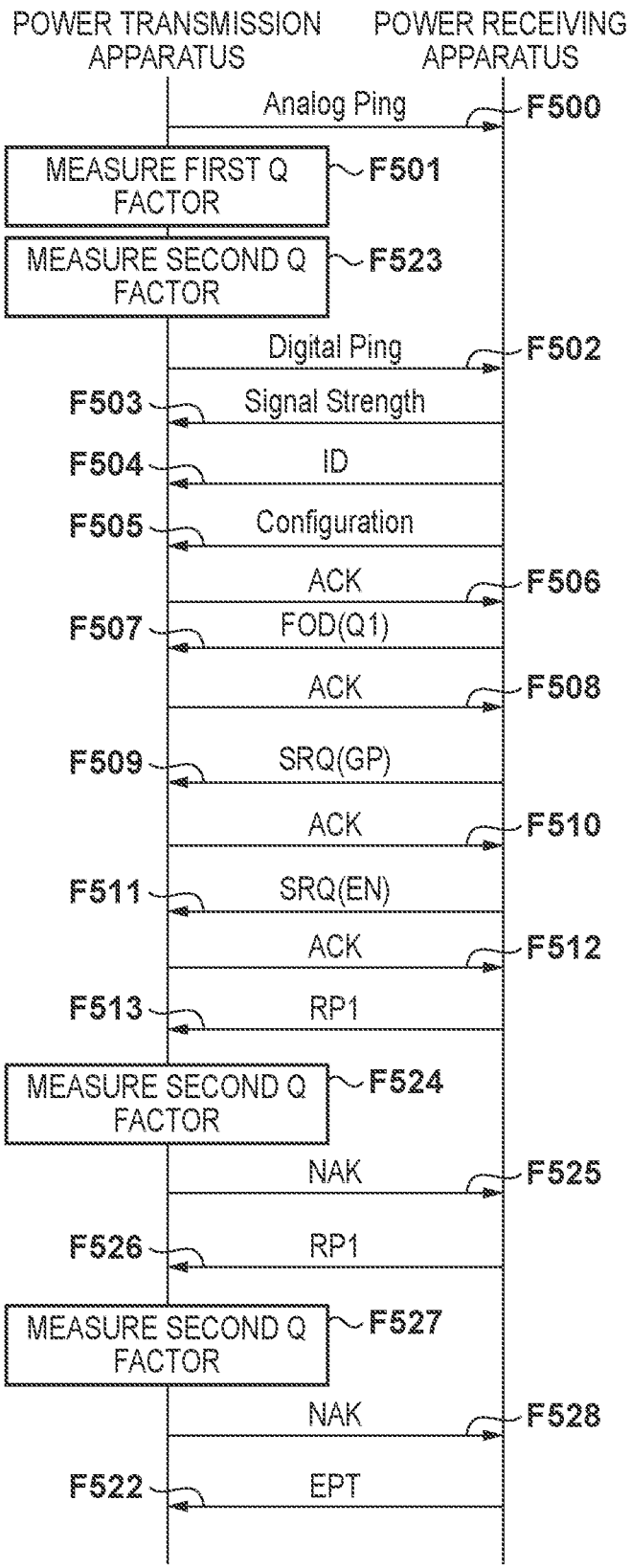
FIG. 5B is a sequence chart for explaining the operations of the power transmission apparatus and the power receiving apparatus according to the embodiment.

The operations of the power transmission apparatus 100 and the power receiving apparatus 102 according to this embodiment will be described with reference to FIG. 5B. FIG. 5B is a sequence chart for explaining the operations of the power transmission apparatus 100 and the power receiving apparatus 102 according to this embodiment. Note that concerning the same configurations as in FIG. 5A, same reference numerals are added, and a description thereof will be omitted.

After first Q factor measurement (F501), the power transmission apparatus 100 quickly executes second Q factor measurement (F523). At the point of time when an ACK is transmitted in response to FOD(Q1) (F507) (F508), the power transmission apparatus 100 determines the second Q factor measured in F523 as the reference Q factor (third reference Q factor) in third foreign object detection processing. Although not illustrated here, assume that a foreign object is placed in the Operating Volume after the second Q factor measurement (F523) until the power receiving apparatus 102 transmits the RP1 (F513). The power transmission apparatus 100 executes second Q factor measurement in F524 and performs foreign object detection by comparing the Q factor with the third reference Q factor, thereby detecting the presence/absence of a foreign object (corresponding to the processes of steps S701 and S702). If the power transmission apparatus 100 detects a foreign object, the power transmission apparatus 100 transmits an NAK in response to the RP1 (F525). Upon receiving the NAK (F525), the power receiving apparatus 102 resends the RP1 (F526). Upon receiving the RP1, the power transmission apparatus 100 executes second Q factor measurement again (F527). If the foreign object is not removed (if the foreign object still exists), the power transmission apparatus 100 transmits an NAK again (F528). Since creation of a Calibration data Point by the power transmission apparatus 100 is not performed, the power receiving apparatus 102 transmits an EPT (F522).

As described above, even if a foreign object is placed in the Operating Volume after the second Q factor measurement (F523) until the power receiving apparatus 102 transmits the RP1 (F513), the power transmission apparatus 100 according to this embodiment can detect the foreign object before creation of a Calibration data Point.

Also, although not illustrated, even in a case where a foreign object is placed in the Operating Volume after the power transmission apparatus 100 transmits an ACK in response to the RP1 until the RP2 is received, second Q factor measurement is executed before the response to the RP2 is transmitted. Hence, the power transmission apparatus 100 can detect the foreign object before creation of a Calibration data Point to the RP2.

Also, after the power receiving apparatus 102 is activated, and relatively large power is started, the power transmission apparatus 100 according to this embodiment does not perform first Q factor measurement (first foreign object detection processing), and performs foreign object detection based on the Q factor by second Q factor measurement (third foreign object detection processing). Hence, the power transmission apparatus 100 need not sweep the operating frequency during transmission of large power and can perform low-noise control. In addition, when sweeping the operating frequency, the power transmission apparatus 100 needs a wait time until the frequency stabilizes when switching the operating frequency. However, since the second Q factor measurement is performed using a fixed frequency, the wait time is unnecessary, and a high-speed operation can be performed.

[First Modification]

In the first embodiment, the power transmission apparatus 100 sets the result of second Q factor measurement (step S602) as the reference Q factor (third reference Q factor) in third foreign object detection processing. In the first modification, a configuration in which the power transmission apparatus 100 determines the third reference Q factor based on information received from the power receiving apparatus 102 will be described. Note that the power transmission apparatus 100 to be described in this modification can have any of the configurations described in the first embodiment except configurations characteristic to this modification.

Figures 1, 6B:
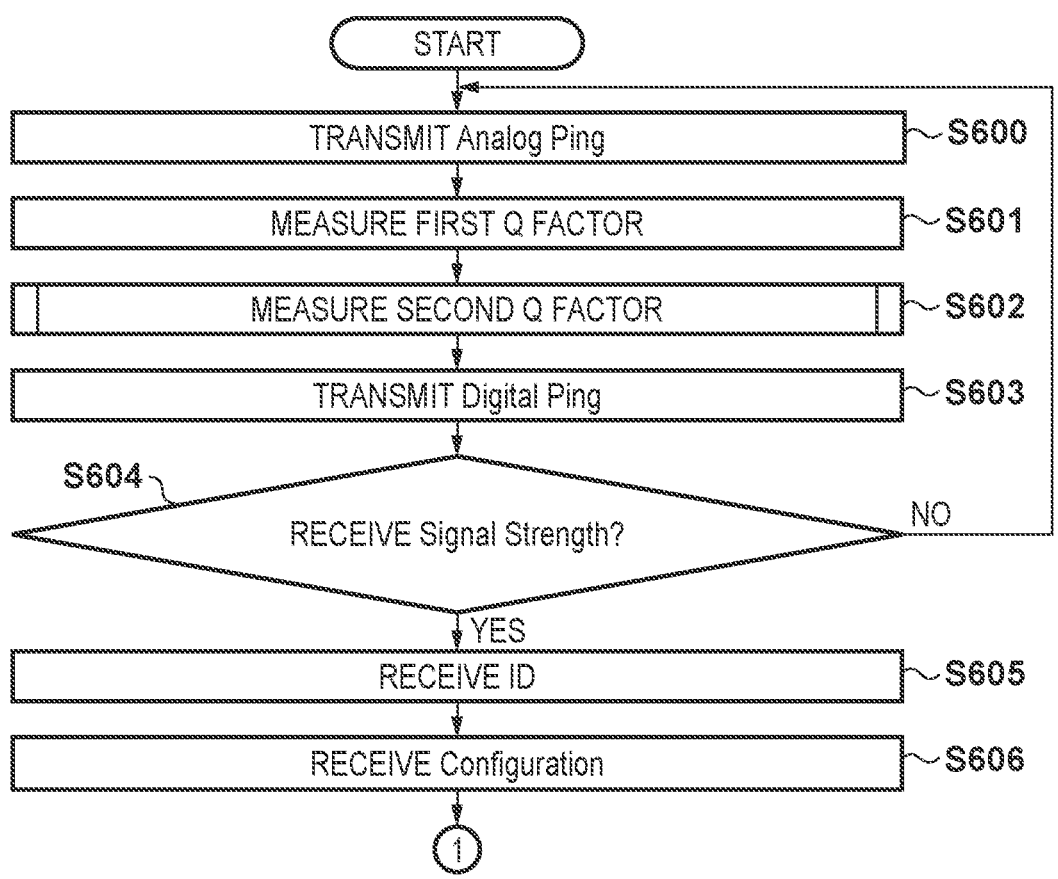
Figures 2, 6B:
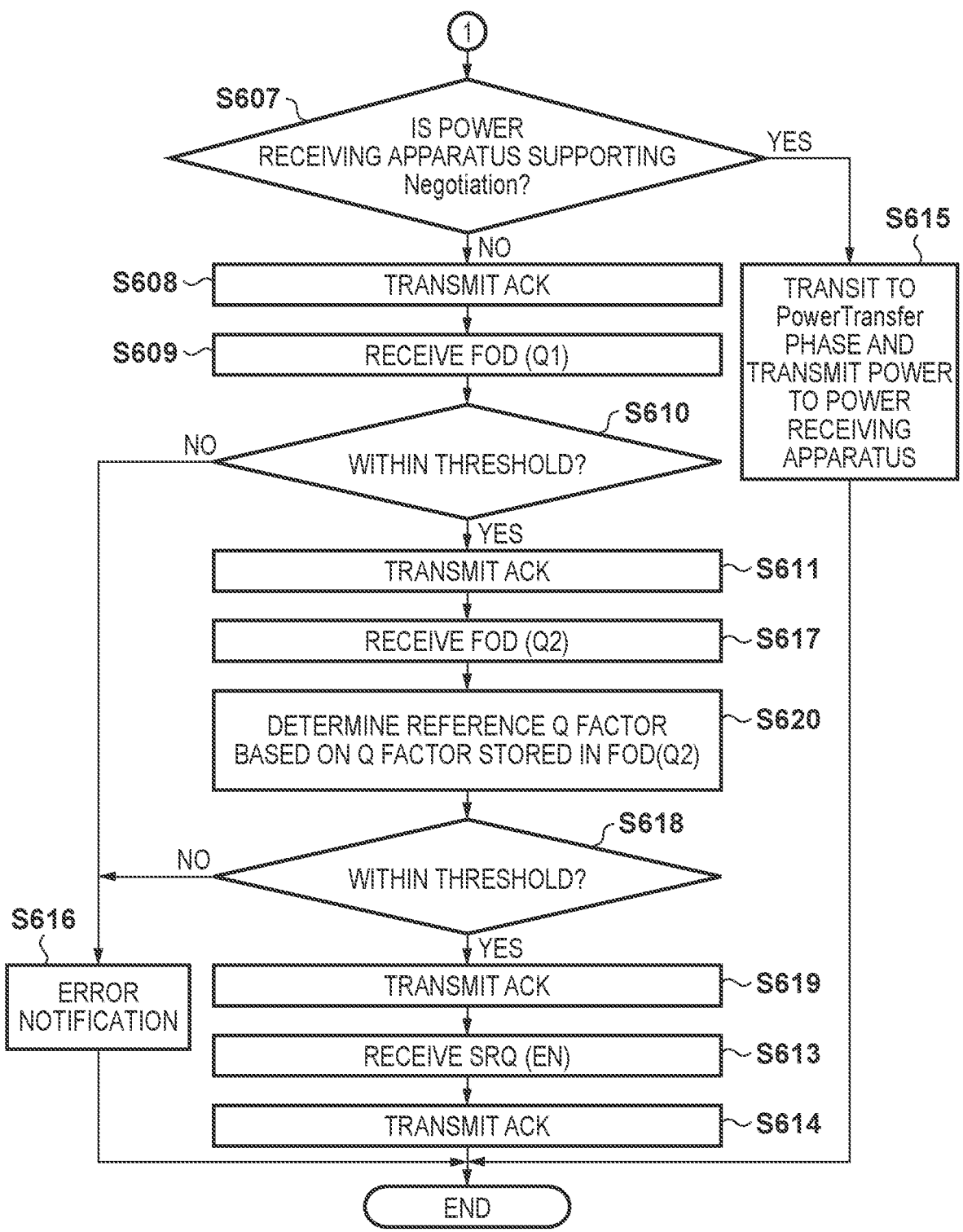

FIGS. 6B-1 and 6B-2 are flowcharts of another reference Q factor creation processing for the third foreign object detection method executed by the power transmission apparatus 100. Note that concerning already described configurations, same reference numerals are added, and a description thereof will be omitted. Upon receiving an ACK in response to FOD(Q1), the power receiving apparatus 102 stores, as a reference value in an FOD Status packet, the Q factor (second characteristic value) of the power transmission coil, which is measured by the second Q factor measuring method in a state in which the power receiving apparatus is placed on the power transmission coil defined by the WPC standard, and transmits the FOD Status packet. In this embodiment, the FOD Status packet will be expressed as FOD(Q2). Note that the Q factor (Q2) stored in the FOD Status packet can be stored in advance in the nonvolatile memory (not shown) of the power receiving apparatus 102. Note that the second characteristic value is the Q factor of the power transmission coil, which is measured by the second Q factor measuring method without a foreign object.

The power transmission apparatus 100 receives the FOD (Q1), judges that the possibility of absence of a foreign object is high, and after that, receives the FOD(Q2) (step S617). Upon receiving the FOD(Q2), the power transmission apparatus 100 estimates, from the Q factor stored in the packet, the Q factor of the power transmission coil of its own in a case where the power receiving apparatus 102 is placed on the power transmission apparatus 100 itself. The power transmission apparatus 100 determines (sets) the estimated Q factor as the reference Q factor (third reference Q factor) in third foreign object detection processing (step S620). The power transmission apparatus 100 then compares the second Q factor measured in step S602 with the third reference Q factor by the above-described method (see FIG. 9). If the second Q factor is within the threshold (YES in step S618), the power transmission apparatus 100 transmits an ACK (step S619). Upon determining that the measured second Q factor is not within the threshold (NO in step S618), the power transmission apparatus 100 makes an error notification to the user (step S616), and the processing is ended. After the third reference Q factor is determined, the power transmission apparatus 100 operates based on the procedure shown in FIG. 7 described above. Note that the power transmission apparatus 100 may determine (set) the Q factor stored in the received FOD(Q2) as the reference Q factor (third reference Q factor) of third foreign object detection processing.

FIG. 10 shows the frame format of the FOD Status packet defined by the WPC standard. Bit0 to bit1 of Bank1 represent a mode (1000), and can designate the type of the FOD Status packet. When FOD(Q2) according to this embodiment is expressed as, for example, "10" in a mode binary number ("2" in a decimal number), this can be discriminated from mode "00" of FOD(Q1). Also, even if the first Q factor and the second Q factor are identical Q factors, it is not guaranteed that these match because the measuring methods are different. Hence, even if the Q factors are the same, when the Q factors are transmitted to the power transmission apparatus 100 on a measuring method basis (FOD(Q1) and FOD(Q2)), foreign object detection processing based on each measuring method can more correctly be performed as compared to a case where only one of these is transmitted.

Also, even in the configuration according to this modification, it is obvious that the same effects as the already described effects can be obtained. Furthermore, in this modification, two types of foreign object detection processing are performed based on the Q factors stored in FOD(Q1) and FOD(Q2), and first Q factor measurement and second Q factor measurement. Unless it is determined that the possibility of absence of a foreign object is high in both types of foreign object detection processing, the processing is ended (error exit occurs) after an error notification. This can further increase the accuracy of foreign object detection s compared to a case where foreign object detection is performed based on one type of foreign object detection processing.

Also, in this modification, unless it is determined that the possibility of absence of a foreign object is high in the two types of foreign object detection processing, error exit occurs. Instead of error exit, the load power (the power consumed by loads) of the power receiving apparatus 102, which is a power value agreed between the power receiving apparatus 102 and the power transmission apparatus 100 may be limited. In particular, a configuration in which the agreed power value is limited to 5 W or less without creating the Calibration curve of second foreign object detection processing described above may be employed. Even in this case, the same effects as the already described effects can be obtained.

Also, in this modification, the power receiving apparatus 102 is configured to individually transmit FOD(Q1) and FOD(Q2). However, if it is guaranteed that the Q factors measured by first Q factor measurement and second Q factor measurement match even if the measuring methods are different, the power receiving apparatus 102 may transmit not FOD(Q2) but only FOD(Q1), and the power transmission apparatus 100 may execute first foreign object detection processing and third foreign object detection processing based on the FOD(Q1). Accordingly, the power receiving apparatus 102 need not transmit FOD(Q2), and the processing can be speeded up.

[Second Modification]

In this modification, a case where second Q factor measurement is performed at a plurality of frequencies in step S602 in FIGS. 6A and 6B-1 will be described. Note that the power transmission apparatus 100 to be described in this modification can have any of the configurations described in the first embodiment and the first modification except configurations characteristic to this modification.

For example, in step S602 of FIGS. 6A and 6B-1, the power transmission apparatus 100 performs second Q factor measurement at three points corresponding to operating frequencies of 110 kHz, 125 kHz, and 145 kHz within the frequency range from 100 kHz to 148.5 kHz, and the measured values at the three points are interpolated with respect to the frequencies. As an example, when the Q factor at the operating frequency of 100 kHz is 87, the Q factor at 125 kHz is 84, and the Q factor at 145 KHz is 80, the frequencies are plotted along the abscissa, and the Q factors are plotted along the ordinate. Q factors from 100 kHz to 125 kHz, from 125 kHz to 145 kHz, and from 145 kHz to 148.5 kHz are linearly interpolated with reference to the three frequencies and the Q factors. The power transmission apparatus 100 obtains, from the interpolated data, a Q factor corresponding to an operating frequency when second Q factor measurement (steps S701 and S705) is performed to create a Calibration data Point, and determines the obtained Q factor as the reference Q factor (third reference Q factor) in third foreign object detection processing. The power transmission apparatus 100 performs third foreign object detection processing based on the result of second Q factor measurement and the third reference Q factor.

Accordingly, in addition to the already described effects, in the WPC standard in which the operating frequency may sequentially change, third foreign object detection processing can be performed in consideration of the operating frequency every time a Calibration data Point is created. This can obtain the effect that more correct foreign object detection can be performed if the Q factor has a nonnegligible frequency characteristic in the range from 110 kHz to 148.5 kHz.

[Third Modification]

In the above-described first embodiment and the first and second modifications, processing of the power transmission apparatus 100 for RP1 and RP2 transmitted from the power receiving apparatus 102 has been described. In the third modification, processing of the power transmission apparatus 100 for RP0 transmitted from the power receiving apparatus 102 will be described. Note that the power transmission apparatus 100 to be described in this modification can have any of the configurations described in the first embodiment and the first and second modifications except configurations characteristic to this modification.

Upon receiving RP0, the power transmission apparatus 100 executes second foreign object detection processing and third foreign object detection processing. The power transmission apparatus 100 responds to the RP0 based on the results of the second foreign object detection processing and the third foreign object detection processing. The relationship between the results and the responses will be described.

If both the results of the second foreign object detection processing and the third foreign object detection processing indicate that "the possibility of absence of a foreign object is high", the power transmission apparatus 100 responds to the RP0 by an ACK representing that the possibility of absence of a foreign object is high. On the other hand, if the result of the second foreign object detection processing indicates that "the possibility of absence of a foreign object is high", and the result of the third foreign object detection processing indicates that "the possibility of presence of a foreign object is high", if the result of the second foreign object detection processing indicates that "the possibility of presence of a foreign object is high", and the result of the third foreign object detection processing indicates that "the possibility of absence of a foreign object is high", or if the result of the second foreign object detection processing indicates that "the possibility of presence of a foreign object is high", and the result of the third foreign object detection processing indicates that "the possibility of presence of a foreign object is high", the power transmission apparatus 100 responds by an NAK representing that the possibility of presence of a foreign object is high.

Instead of transmitting the NAK, the power transmission apparatus 100 may transmit, to the power receiving apparatus 102, data used to decrease the power to be supplied to the loads of the power receiving apparatus 102. More specifically, upon judging that the power receiving apparatus 102 has a capability of performing Re-Negotiation concerning the above-described Guaranteed Power, the power transmission apparatus 100 may respond to the RP0 by a pattern that has the same data length as the ACK and the NAK but is different, and cause the power receiving apparatus 102 to perform Re-Negotiation concerning the Guaranteed Power. After responding to the RP0 by the different pattern, and before the power receiving apparatus 102 requests Re-Negotiation, the power transmission apparatus 100 may notify the power receiving apparatus 102 of the maximum value of the negotiable Guaranteed Power. The maximum value of the negotiable Guaranteed Power may be limited to 5 W. Upon judging that the power receiving apparatus 102 does not have a capability of performing Re-Negotiation concerning the Guaranteed Power, the power transmission apparatus 100 may decrease the transmission power to 5 W or stop the transmission power after the transmission of an NAK.

As described above, when the configuration according to the third modification is added to the configuration of the power transmission apparatus 100 described in the first embodiment and the first and second modifications, third foreign object detection can be performed during execution of second foreign object detection, in addition to the above-described effects. Also, upon judging that at least one of the results of two types of foreign object detection processing indicates that the possibility of presence of a foreign object is high, the power transmission apparatus 100 limits the transmission power. This can implement a more safe wireless power transmission system.

[Fourth Modification]

In the first embodiment and the first, second, and third modifications, a change of a Q factor caused by a foreign object and processing of the power transmission apparatus 100 for the change have been described. However, the change of the Q factor can also occur in a case where the power receiving apparatus 102 moves on the power transmission apparatus 100, as indicated by the arrow 104 in FIG. 1, and the positional relationship between the power transmission apparatus 100 and the power receiving apparatus 102 changes before and after the movement. In this modification, a configuration considering such movement of the power receiving apparatus 102 will be described. Note that the power transmission apparatus to be described in this modification can have any of the above-described configurations except configurations characteristic to this modification.

In the first embodiment and the first, second, and third modifications, one threshold is used for third foreign object detection. The power transmission apparatus 100 sets a Q factor lower by a % than the third reference Q factor as a threshold (the threshold 901 in FIG. 9). If the measured second Q factor is lower than the threshold, it is determined that the possibility of presence of a foreign object is high. Otherwise, it is determined that the possibility of absence of a foreign object is high. In this modification, a configuration including a plurality of thresholds in third foreign object detection will be described.

More specifically, a Q factor lower by b % (a>b) (second ratio) than the third reference Q factor is defined as a second threshold. Based on the two defined thresholds, the power transmission apparatus 100 performs the following determination and handling. Note that in this modification, a threshold as a Q factor lower by a % than the third reference Q factor will be expressed as a first threshold.

If the Q factor measured by second Q factor measurement falls between the third reference Q factor and the second threshold, the power transmission apparatus 100 determines that the possibility that neither a foreign object nor the movement of the power receiving apparatus is present is high, and transmits an ACK.

If the Q factor measured by second Q factor measurement falls between the first threshold and the second threshold, the power transmission apparatus 100 determines that the possibility of absence of a foreign object is high, but the possibility that the power receiving apparatus has moved is high. If a Calibration data Point is not created yet, the power transmission apparatus 100 transmits an ACK. If a Calibration data Point is already created, the power transmission apparatus 100 causes the power receiving apparatus 102 to perform Re-Calibration.

If the Q factor measured by second Q factor measurement is smaller than the first threshold, the power transmission apparatus 100 determines that possibility of presence of a foreign object is high, and transmits an NAK.

Calibration processing according to this modification will be described with reference to FIG. 7. In step S702, if the second Q factor measured in step S701 falls between the third reference Q factor and the second threshold (if the second Q factor falls between the third reference Q factor and a Q factor lower by b % than the third reference Q factor), the third foreign object detection processing unit 405 determines that the possibility that neither a foreign object nor the movement of the power receiving apparatus 102 is present is high, and the communication unit 305 transmits an ACK (YES in step S702, and step S703). On the other hand, if the second Q factor measured in step S701 is smaller than the first threshold (if the second Q factor is smaller than a Q factor lower by a % than the third reference Q factor), the third foreign object detection processing unit 405 determines that the possibility of presence of a foreign object is high, and the communication unit 305 transmits an NAK (NO in step S702, and step S708). Also, in step S702, if the second Q factor measured in step S701 falls between the first threshold and the second threshold (if the second Q factor falls between the Q factor lower by b % than the third reference Q factor and the Q factor lower by a % than the third reference Q factor), the third foreign object detection processing unit 405 determines that the possibility of absence of a foreign object is high, but the possibility that the power receiving apparatus 102 has moved is high. At the point of time of step S702, since the first Calibration data Point corresponding to RP1 has not been created yet, the communication unit 305 of the power transmission apparatus 100 transmits an ACK (YES in step S702, and S703).

Also, in step S706, if the second Q factor measured in step S705 falls between the third reference Q factor and the second threshold, the third foreign object detection processing unit 405 determines that the possibility that neither a foreign object nor the movement of the power receiving apparatus 102 is present is high, and the communication unit 305 transmits an ACK (YES in step S706, and step S707). On the other hand, in step S706, if the second Q factor measured in step S705 is smaller than the first threshold, the third foreign object detection processing unit 405 determines that the possibility of presence of a foreign object is high, and the communication unit 305 transmits an NAK (NO in step S706, and step S708). Also, in step S706, if the second Q factor measured in step S705 falls between the first threshold and the second threshold, the third foreign object detection processing unit 405 determines that the possibility of absence of a foreign object is high, but the possibility that the power receiving apparatus 102 has moved is high. At the point of time of transmitting the ACK in step S703, the power transmission apparatus 100 has created the first Calibration data Point for RP1. Hence, the power transmission apparatus 100 causes the power receiving apparatus 102 to execute Re-Calibration concerning the RP1. As a means for causing the power receiving apparatus 102 to execute Re-Calibration, the communication unit 305 of the power transmission apparatus 100 responds to the RP2 received in step S704 by a pattern that has the same data length as the ACK and the NAK but is different.

The power receiving apparatus 102 that has received the pattern that has the same data length as the ACK and the NAK but is different as the response to the RP2, does not resend the RP2 and transmits the RP1 again. The power receiving apparatus 102 transmitting the RP1 again means that the power transmission apparatus 100 invalidates or discards the Calibration data Point already created for the RP1 in step S703 and newly creates a Calibration data Point for the RP1. If the communication unit 305 of the power transmission apparatus 100 transmits the pattern that has the same data length as the ACK and the NAK but is different, and after that, receives the RP1 in a predetermined time, the Calibration processing unit 402 invalidates or discards an already created Calibration data Point RP1. The third foreign object detection processing unit 405 updates the reference Q factor (third reference Q factor) in the third foreign object detection processing to the second Q factor measured in step S705. After that, the process returns to step S701 (second Q factor measuring processing). The third foreign object detection processing unit 405 compares the second Q factor measured in step S701 with the first threshold and the second threshold based on the updated third reference Q factor. In a case where the measured second Q factor falls between the third reference Q factor and the second threshold as well, the third foreign object detection processing unit 405 determines that the possibility that neither a foreign object nor the movement of the power receiving apparatus 102 is present is high, and the communication unit 305 transmits an ACK. From then on, in accordance with the already described procedure, the Calibration processing unit 402 creates a Calibration curve, and the second foreign object detection processing unit 404 performs second foreign object detection processing.

The result of the Re-Calibration processing described in this modification will be described with reference to FIG. 12. Assume that the power transmission apparatus 100 has already created the point 1200 that is the Calibration data Point for the RP1. In third foreign object detection processing immediately after RP2 corresponding to the point 1204 that is a Calibration data Point is received from the power receiving apparatus 102 (steps S705 and S706), the power transmission apparatus 100 determines that the possibility of absence of a foreign object is high, but the possibility that the power receiving apparatus has moved is high. If an ACK is transmitted in response to the RP2, the power transmission apparatus 100 creates the already described line 1206 as a Calibration curve. A correct Calibration curve cannot be obtained, and correct foreign object detection cannot be performed. Hence, the power transmission apparatus 100 responds to the RP2 by the pattern that has the same data length as the ACK and the NAK but is different, and causes the power receiving apparatus 102 to execute Re-Calibration. Upon receiving RP1 corresponding to a point 1207, the power transmission apparatus 100 invalidates or discards the point 1200 that is the already created Calibration data Point, and newly accepts the point 1207 as a Calibration data Point. Upon accepting the point 1204 that is a Calibration data Point corresponding to RP2, the power transmission apparatus 100 creates a line 1208 as a Calibration curve in a case where the power receiving apparatus 102 moves, and executes second foreign object detection processing based on the line 1208 from then on. Note that even if it is determined that the power receiving apparatus 102 has moved, if the first Calibration data Point (point 1200) has not been created, the power transmission apparatus 100 accepts the Calibration data Point corresponding to the point 1207 when receiving the RP1.

As described above, according to this modification, the power transmission apparatus 100 determines, based on the Q factor in third foreign object detection processing, whether a foreign object exists in the Operating Volume, or the power receiving apparatus 102 has moved. If the power receiving apparatus 102 has moved, and a Calibration data Point has already been created, the power transmission apparatus 100 causes the power receiving apparatus 102 to execute Re-Calibration. Accordingly, in addition to the already described effects, it is possible to perform more correct second foreign object detection processing considering the change of the Q factor caused by movement of the power receiving apparatus 102.

In the above-described example, the power transmission apparatus 100 transmits the pattern that has the same data length as the ACK and the NAK but is different to cause the power receiving apparatus 102 to execute Re-Calibration, and invalidates or discards the Calibration data Point already created at the point of time of newly receiving the RP1. Instead, the same effects as described above can be obtained by invalidating or discarding the already created Calibration data Point at the point of time of transmitting the pattern that has the same data length as the ACK and the NAK but is different.

Also, in the above-described example, if the second Q factor measured by second Q factor measurement falls between the first threshold and the second threshold (if the second Q factor falls between the Q factor lower by b % than the third reference Q factor and the Q factor lower by a % than the third reference Q factor), the power transmission apparatus 100 determines that the possibility of absence of a foreign object is high, but the possibility that the power receiving apparatus 102 has moved is high. If the Calibration data Point is already created, to cause the power receiving apparatus 102 to execute Re-Calibration, the power transmission apparatus 100 transmits the pattern that has the same data length as the ACK and the NAK but is different. Here, the power transmission apparatus 100 further determines whether the power receiving apparatus 102 supports Re-Calibration (whether the power receiving apparatus 102 can understand the pattern that has the same data length as the ACK and the NAK but is different). Upon determining that the power receiving apparatus 102 supports Re-Calibration, the pattern that has the same data length as the ACK and the NAK but is different may be transmitted.

"Whether the power receiving apparatus 102 supports Re-Calibration" here can also be replaced with "whether the power receiving apparatus 102 has a function of judging that not RP2 but RP1 should be transmitted in a case where the pattern that has the same data length as the ACK and the NAK but is different is received". In addition, for example, a bit representing whether the power receiving apparatus 102 supports Re-Calibration may be provided in the Reserved region of the Configuration packet transmitted from the power receiving apparatus 102. For example, bit5 of Bank2 that is the reserved region of the Configuration packet of the WPC standard v1.2.3 may be used as the bit representing whether the power receiving apparatus 102 supports Re-Calibration. More specifically, the power receiving apparatus 102 stores "1" in the packet if it supports Re-Calibration, and otherwise (if the power receiving apparatus 102 does not support Re-Calibration), stores "O" in the packet. Hence, when this packet is received, the power transmission apparatus 100 can judge whether the power receiving apparatus 102 supports Re-Calibration.

Also, the WPC standard v1.2.3 defines that if the RP1 is received again in a state in which the RP1 is already received, the power transmission apparatus should transmit an NAK in response to the RP1 received again. However, if the power receiving apparatus 102 supports Re-Calibration, and the power receiving apparatus 102 is caused to execute Re-Calibration, the power transmission apparatus 100 according to this modification may transmit an ACK or an NAK in response to the RP1 received again based on second Q factor measurement and third foreign object detection processing. If the power receiving apparatus 102 does not support Re-Calibration, the power transmission apparatus 100 may transmit an NAK in response to the RP1 received again. This makes it possible to ensure backward compatibility in addition to the effects described above.

Additionally, in this modification, if the second Q factor measured by second Q factor measurement falls between the first threshold and the second threshold (if the second Q factor falls between the Q factor lower by b % than the third reference Q factor and the Q factor lower by a % than the third reference Q factor), and a Calibration data Point is already created, the power transmission apparatus 100 causes the power receiving apparatus 102 to execute Re-Calibration. As an example in which the Calibration data Point is already created, reception of RP2 (a Calibration data Point corresponding to RP1 already exists) has been described. This processing may be applied when RP0 is received. More specifically, there can be considered a case where the power receiving apparatus 102 transmits the RP1, receives an ACK, and then transmits RP0 before transmission of the RP2, or a case where the power transmission apparatus 100 has already created a Calibration curve and performs second foreign object detection processing. In these cases as well, the power transmission apparatus 100 detects the movement of the power receiving apparatus 102 based on third foreign object detection processing and performs Re-Calibration, thereby obtaining the same effects as described above.

Also, in this modification, the necessity of the Re-Calibration is judged based on only third foreign object detection processing. However, the judgment may be done in combination of the result of second foreign object detection processing. More specifically, upon receiving the RP0, if the possibility of absence of a foreign object is high as the result of second foreign object detection, but the second Q factor is smaller than the second threshold as the result of third foreign object detection processing, the power transmission apparatus 100 may determine that Re-Calibration is necessary. The power transmission apparatus 100 may then execute processing for causing the power receiving apparatus 102 to perform already described Re-Calibration.

Upon judging that the possibility of presence of a foreign object is high as the result of second foreign object detection, the power transmission apparatus 100 may respond to the RP0 by an NAK independently of the result of third foreign object detection processing. Also, upon receiving the RP0, if the possibility of absence of a foreign object is high as the result of second foreign object detection, and the second Q factor is larger than the second threshold as the result of third foreign object detection processing, the power transmission apparatus 100 may determine that the possibility of absence of a foreign object is high, and Re-Calibration is not necessary, and respond to the RP0 by an ACK. With the above-described configuration, the power transmission apparatus 100 can perform control based on the result of both second foreign object detection processing and third foreign object detection processing.

Other Embodiments

In the first embodiment and the first to fourth modifications, after the first Q factor is measured, the second Q factor is measured. Even if the second Q factor measurement is performed first, the same effects as described above can be obtained. Also, the second Q factor measurement is executed after RP1 and RP2 are received. Even if it is executed before the measurement of RP1 and RP2, the same effects as described above can be obtained. Also, the third reference Q factor for third foreign object detection processing only needs to be a measurable electric characteristic, and need not be the second Q factor itself. For example, the gradient ($A_4$-$A_3$/$T_4$-$T_3$) of times and voltage values at the points 1104 and 1105 may be used. In this case, the power transmission apparatus 100 calculates not the Q factor but the gradient of times and voltage values in the second Q factor measurement. In this case, the threshold 901 need not be the Q factor and may be the gradient of times and voltage values. Also, in place of the second reference Q factor, a coupling coefficient representing the strength of coupling between the power transmission coil and the power receiving coil may be used. In this case, the power transmission apparatus 100 calculates not the Q factor but the coupling coefficient in the second Q factor measurement. In this case, the threshold 901 need not be the Q factor and may be the coupling coefficient. In any configuration, the same effects as the already described effects can be obtained.

Also, the third foreign object detection processing may be performed not based on the Q factor but based on the time difference and the difference of current values or the ratio of current values. The third foreign object detection processing may be performed based on the time difference and the ratio of voltage values.

Also, when transmitting FOD(Q2) to the power transmission apparatus, the power receiving apparatus 102 stores the Q factor in the FOD Status packet and transmits it. In addition to this, a frequency at which the second Q factor is measured may be transmitted to the power transmission apparatus 100. The second Q factor and the frequency may be a set of a plurality of second Q factors and a plurality of frequencies at which these are measured. The power receiving apparatus 102 may store the second Q factor and the frequency in the same packet or transmit these in different packets. When transmitting these in different packets, the power receiving apparatus 102 may set mode in the FOD Status packet to "11 (binary)" and transmit information about the above-described frequency. The information about the frequency may include a voltage value and a current value supplied to the loads of the power receiving apparatus 102 and values (an impedance, a load resistance, and power) calculated from these.

Also, in the first embodiment and the first to fourth modifications, the voltage value of the power transmission coil is measured in the second Q factor measurement. However, this may be a current value. The first second Q factor measurement (step S602) is executed before transmission of the Digital Ping is started (step S603), as described above. However, the second Q factor measurement (step S602) may be executed after transmission of the Digital Ping is started (step S603).

Also, in the first embodiment and the first to fourth modifications, the first second Q factor measurement may be executed immediately after the Signal Strength is received.

Since the second Q factor measurement is performed only in a state in which the power receiving apparatus exists in the Operating Volume, it is possible to prevent the second Q factor measurement from being wastefully executed in a state in which only a foreign object exists.

Additionally, the power transmission apparatus 100 according to the first embodiment and the first to fourth modifications may define processing to be performed when the CE(+) is received based on third foreign object detection processing. More specifically, upon determining, as the result of third foreign object detection, that the possibility of presence of a foreign object is high, or the power receiving apparatus 102 should be caused to execute Re-Calibration, the set value of the power transmitting unit 303 for CE(+) may be changed to inhibit processing of increasing transmission power. Furthermore, the power transmission apparatus 100 may execute the second Q factor measurement and the third foreign object detection processing every time CE(+) is received. This makes it possible to execute foreign object detection, which is conventionally executed only in the cycle of receiving RP0, RP1, and RP2, in a shorter cycle.

Also, in the first embodiment and the first to fourth modifications, the threshold in third foreign object detection processing is different from the threshold in first foreign object detection processing, as described above. However, the threshold in third foreign object detection processing may be the same as the threshold in first foreign object detection processing, and the threshold in first foreign object detection processing may be diverted.

Also, in the first embodiment and the first to fourth modifications, the power transmission apparatus 100 temporarily stops power transmission in second Q factor measurement, as described above. However, a configuration for limiting transmission power may be employed. More specifically, the transmission power may be lowered to an arbitrary value except zero.

Other Embodiments

The present disclosure can be implemented by processing of supplying a program for implementing one or more functions of the above-described embodiments to a system or apparatus via a network or storage medium, and causing one or more processors in the computer of the system or apparatus to read out and execute the program. The present disclosure can also be implemented by a circuit (for example, an ASIC) for implementing one or more functions.

More specifically, at least a part of the processing shown in the flowcharts of FIGS. 5A and 5B may be implemented by hardware. When implementing the processing by hardware, for example, a dedicated circuit is automatically generated, using a predetermined compiler, on an FPGA from a program configured to implement the steps. FPGA is short for Field Programmable Gate Array. Also, like the FPGA, a Gate Array circuit may be formed and implemented as hardware.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

The invention claimed is:

1. A power transmission apparatus comprising:
a coil; and
one or more processors configured to cause the power transmission apparatus to:
wirelessly transmit power to a power receiving apparatus via the coil;
negotiate with the power receiving apparatus;
measure a Q factor based on a decay envelope in a period in which power transmission is limited after an end of a negotiation with the power receiving apparatus before generation of a calibration curve;
perform a first foreign object detection, based on the measured Q factor and a reference Q factor;
perform a second foreign object detection based on a power loss between the power transmission apparatus and the power receiving apparatus;
in a case where the measured Q factor is greater than a first threshold and less than or equal to a second threshold, transmit a recalibration request to the power receiving apparatus, wherein the second threshold is greater than the first threshold and less than the reference Q factor;
in a case where the measured Q factor is greater than the second threshold,
generate the calibration curve, which is used for the second foreign object detection, and
perform the second foreign object detection based on the power loss and the generated calibration curve.

2. The power transmission apparatus according to claim 1, wherein the reference Q factor is determined based on information obtained from the power receiving apparatus.

3. The power transmission apparatus according to claim 1, wherein the decay envelope is a decay envelope with respect to a time of a voltage applied to the coil.

4. The power transmission apparatus according to claim 1, wherein the decay envelope is a decay envelope with respect to a time of a transmission current flowing to the coil.

5. A method for a power transmission apparatus including a coil, the power transmission apparatus configured to wirelessly transmit power to a power receiving apparatus via the coil, the method comprising:
negotiating with the power receiving apparatus;
measuring a Q factor based on a decay envelope in a period in which power transmission is limited after an end of a negotiation with the power receiving apparatus before generation of a calibration curve;
performing a first foreign object detection, based on the measured Q factor and a reference Q factor;
performing a second foreign object detection based on a power loss between the power transmission apparatus and the power receiving apparatus;
in a case where the measured Q factor is greater than a first threshold and less than or equal to a second threshold, transmitting a recalibration request to the power receiving apparatus, wherein the second threshold is greater than the first threshold and less than the reference Q factor;
in a case where the measured Q factor is greater than the second threshold,
generating the calibration curve, which is used for the second foreign object detection, and
performing the second foreign object detection based on the power loss and the generated calibration curve.

6. A non-transitory computer-readable storage medium storing a program for causing a computer to execute a method for a power transmission apparatus including a coil, the power transmission apparatus configured to wirelessly transmit power to a power receiving apparatus via the coil, the method comprising:
negotiating with the power receiving apparatus;
measuring a Q factor based on a decay envelope in a period in which power transmission is limited after an end of a negotiation with the power receiving apparatus before generation of a calibration curve;
performing a first foreign object detection, based on the measured Q factor and a reference Q factor;
performing a second foreign object detection based on a power loss between the power transmission apparatus and the power receiving apparatus;
in a case where the measured Q factor is greater than a first threshold and less than or equal to a second threshold, transmitting a recalibration request to the power receiving apparatus, wherein the second threshold is greater than the first threshold and less than the reference Q factor;
in a case where the measured Q factor is greater than the second threshold,
generating the calibration curve, which is used for the second foreign object detection, and
performing the second foreign object detection based on the power loss and the generated calibration curve.

* * * * *